United States Patent
Ode

(10) Patent No.: US 8,588,706 B2
(45) Date of Patent: *Nov. 19, 2013

(54) RADIO COMMUNICATION SYSTEM

(75) Inventor: Takayoshi Ode, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/018,645

(22) Filed: Feb. 1, 2011

(65) Prior Publication Data

US 2011/0124298 A1    May 26, 2011

Related U.S. Application Data

(63) Continuation of application No. 11/442,173, filed on May 30, 2006, now Pat. No. 7,949,307.

(30) Foreign Application Priority Data

Jan. 27, 2006  (JP) .................... 2006-018521

(51) Int. Cl.
   *H04B 7/00* (2006.01)
(52) U.S. Cl.
   USPC .......... 455/69; 455/515; 455/452.1; 455/67.7
(58) Field of Classification Search
   USPC ............ 455/69, 515, 452.1, 522, 452.2, 455, 455/509, 517, 516, 68, 434, 67.11, 67.7, 455/70; 370/465, 329
   See application file for complete search history.

(56) References Cited

U.S. PATENT DOCUMENTS

| | | |
|---|---|---|
| 6,385,187 B1 | 5/2002 | Ahn et al. |
| 6,393,010 B1 | 5/2002 | Lunby et al. |
| 6,396,868 B1 | 5/2002 | Yoon et al. |
| 6,665,831 B1 | 12/2003 | Yoshida et al. |
| 7,146,142 B1 | 12/2006 | Raaf |
| 7,298,721 B2 | 11/2007 | Atarashi et al. |
| 8,005,051 B2 | 8/2011 | Watanabe |
| 2005/0041588 A1 | 2/2005 | Kim et al. |
| 2005/0096033 A1* | 5/2005 | Miyawaki et al. ......... 455/422.1 |
| 2006/0019694 A1 | 1/2006 | Sutivong et al. |

(Continued)

FOREIGN PATENT DOCUMENTS

| | | |
|---|---|---|
| EP | 1032233 | 8/2000 |
| JP | 11-154904 | 6/1999 |

(Continued)

OTHER PUBLICATIONS

United States Patent & Trademark Office "Non-Final Office Action" issued for corresponding U.S. Appl. No. 12/878,537, dated Feb. 17, 2012.

(Continued)

*Primary Examiner* — John J Lee
(74) *Attorney, Agent, or Firm* — Myers Wolin, LLC

(57) ABSTRACT

A radio communication system in which a plurality of radio channels are divided in a frequency direction and mapped to a radio frame format, whereby each radio channel mapped in the radio frame format is assigned to each user or service. The radio communication system includes a radio communication apparatus and a terminal to receive a pilot signal and a data signal from the radio communication apparatus, whereby the radio communication apparatus controls a pilot signal position for each user or service and notifies information used for identifying the pilot signal position to the terminal.

5 Claims, 31 Drawing Sheets

(56) References Cited

U.S. PATENT DOCUMENTS

| | | | |
|---|---|---|---|
| 2006/0126577 A1 | 6/2006 | Yano et al. | |
| 2006/0146867 A1* | 7/2006 | Lee et al. | 370/465 |
| 2007/0097915 A1 | 5/2007 | Papasakellariou | |
| 2007/0189199 A1 | 8/2007 | Nishio | |

FOREIGN PATENT DOCUMENTS

| | | |
|---|---|---|
| JP | 2000-252915 | 9/2000 |
| JP | 2000-286818 | 10/2000 |
| JP | 2001-244913 | 9/2001 |
| JP | 2002-523963 | 7/2002 |
| JP | 2002-344422 | 11/2002 |
| JP | 2003-503883 | 1/2003 |
| JP | 2005-020076 | 1/2005 |
| JP | 2005-057610 | 3/2005 |
| WO | 2004/056022 | 7/2004 |
| WO | 2006/007318 | 1/2006 |

OTHER PUBLICATIONS

European Patent Office, Extended European Search Report with Annex issued for corresponding European Patent Application No. 11156172.6, dated Apr. 14, 2011.

3GPP TSG RAN WG1 Ad Hoc on LTE (R1-050604), Sophia Antipolis, France, Jun. 20-21, 2005.

Extended European Search Report for corresponding European Patent Application No. 06252901.1., dated Sep. 16, 2008.

Japanese Patent Office "Notification of Reason for Rejection" issued for corresponding Japanese Patent Application No. 2006-018521, dispatched on Dec. 21, 2010. English translation attached.

The State Intellectual Property Office of China, "First Notification of Office Action" for corresponding Chinese Patent Application No. 201010248674.5, issued May 6, 2011. English translation attached.

Notification of Reason for Rejection issued for corresponding Japanese Patent Application No. 2012-235762 dispatched on Sep. 24, 2013, with English translation.

* cited by examiner

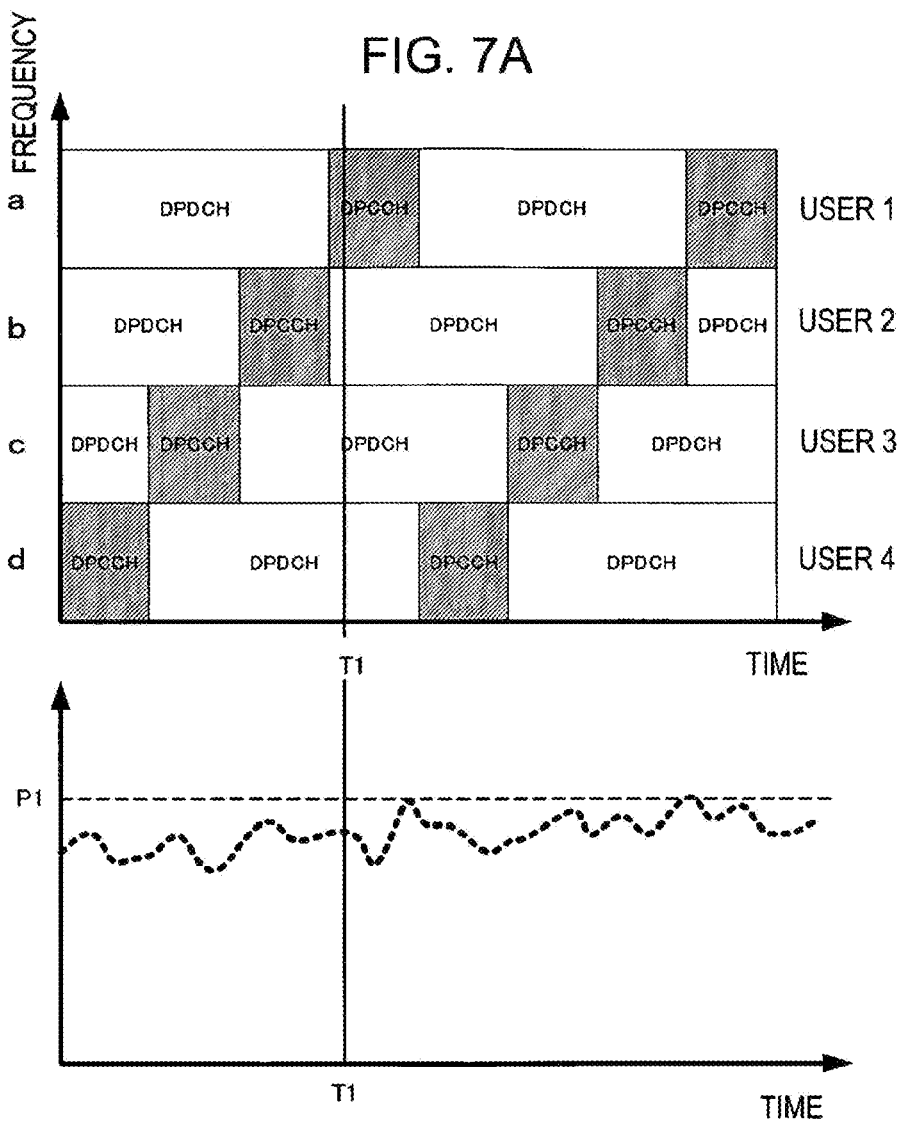

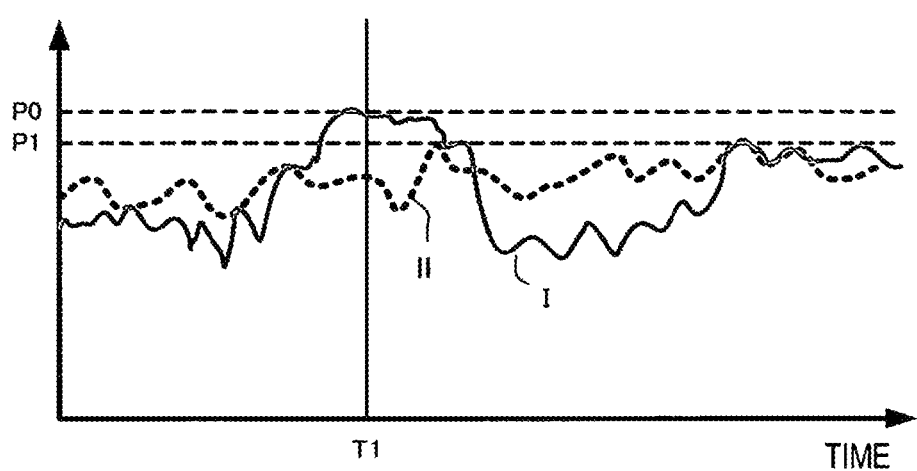

RADIO COMMUNICATION SYSTEM

CROSS REFERENCE TO RELATED APPLICATION

This present application is a continuation of U.S. patent application Ser. No. 11/442,173, filed May 30, 2006, now pending, which is based upon and claims the benefit of Japanese Patent Application No. 2006-18521, filed on Jan. 27, 2006, the contents of each are herein wholly incorporated by reference.

BACKGROUND OF THE INVENTION

1. Field of the Invention

The present invention relates generally to a radio communication system, an, more particularly, to a radio communication system that uses an OFDMA (Orthogonal Frequency Division multiplexing Access) connection mode and a base transceiver station apparatus using the same.

2. Description of the Related Art

Recently, an OFDMA (Orthogonal Frequency Division multiplexing Access) system is applied to a mobile communication system that is one form of radio communication systems.

In the OFDMA, as shown in FIG. 1, for example, a 20 MHz band is divided into a plurality of consecutive 5-MHz sub-carriers, for example, in the frequency direction, and each Sub-carrier is assigned to a user of service to achieve user- or service-multiplexing.

In FIG. 1, consecutive sub-carriers are assigned to four users 1 to 4. Since a plurality of consecutive frequencies is collectively assigned to a plurality of users, this multiplexing method may be referred to as localized OFDMA.

As shown in FIG. 2, the distributed OFDMA is also proposed to select one or a consecutive plurality of sub-carriers at certain frequency intervals to create sub-carrier groups, which are assigned to users.

In such a case, a radio channel used by each user is constituted by a data channel (DPDCH) and a control channel (DPCCH), which are mapped to one radio frame format. The frame format of the radio channel is fixed.

A configuration shown in FIG. 3 is a typical base transceiver station configuration in the mobile radio system, which is the radio communication system using the OFDMA. A control signal on the control channel (DPCCH) from a control signal generating unit 30 and a data signal on the data channel (DPDCH) from an upper layer are mapped to a predetermined format by a frame format generating unit 31.

The output from the frame format generating unit 31 is encoded by an encoding unit 32, is modulated by a modulating unit 33 in a modulation mode such as QPSK, is subjected to frequency conversion to a radio frequency signal by a transmission radio unit 34, and is emitted from an antenna 35.

FIG. 4 is a configuration example of a transmission radio unit 34 and, particularly, is a configuration example of an OFDM radio unit. The output of the modulating unit 33 is converted by an S/P converter 340 to a parallel signal. The parallel signal is subjected to an IFFT process by an inverse Fourier transform (IFFT) circuit 341 and is restored to a serial signal by a P/S converter 342. This serial signal is added with guard intervals GI, is converted to a radio frequency by a frequency converter 345, and is emitted from the antenna 35.

FIG. 5 is a configuration example of a terminal corresponding to the configuration of the base transceiver station of FIG. 3. A received signal received by a reception antenna 40 is subjected to frequency conversion to be a base band signal and is input to a demodulating unit 42. The signal is subjected to a demodulating process corresponding to the modulating unit 33 of the base transceiver station by the demodulating unit 42 and is divided into the data and the control signal by a signal dividing unit 44.

On the other hand, in FIG. 5, received power is measured from a pilot signal and the result thereof is sent to a channel estimating unit 46, etc. The channel estimating unit 46 estimates a propagation path, etc. from the measured power.

In this way, when the terminal performs the measurement of the received power, the channel estimation, the power control, the adaptive modulation control, etc. by receiving the pilot channel or pilot symbol included in the control channel (DPCCH), the intended control is nor performed accurately, unless the transmission quality is ensured at a certain level or more (e.g., an error rate of 1.0E to 2).

To ensure the transmission quality, the transmission power of the control signal on the control channel (DPCCH) is made higher than the case of the usual data transmission.

FIGS. 6A and 6B are diagrams for describing problems to be solved by the present invention. In FIGS. 6A and 6B, FIG. 6A shows a time-frequency distribution of four-user sub-carriers mapped to a radio frame format. The frame format of the radio channel is fixed. Since the control channel (DPCCH) is control information necessary for communication, the transmission quality thereof must be made higher than the data channel (DPDCH).

Therefore, as shown in a transmission power distribution of FIG. 6B, countermeasures are taken in a W-CDMA (Wideband Code Division Multiple Access) system by making the transmission power of the control channel (DPCCH) higher than the data channel (DPDCH). From FIG. 6B, it is understood that the transmission power is made higher at the cycle of the control channel (DPCCH).

In this way, the transmission power of the control signal on the control channel is increased conventionally. As shown in FIGS. 3 and 4, since the OFMDA base transceiver station performs the IFFT, it is desirable that the beginnings of the data for the users, i.e., the beginnings of the radio frames are identical.

If the beginnings of the radio frames are not identical, since the signal process becomes complicated, the apparatus configuration and the control are also complicated. Therefore, the beginnings of the radio frames must be identical.

However, if transmission for a plurality of users is performed concurrently with the use of the fixed radio frame format as described above, the positions of the control channels (DPCCH) are identical (see FIG. 6A). Therefore, since the transmission signal for each user is added in the same phase in the OFDMA, a peak of the transmission power is generated at the time of the transmission on the control channel (DPCCH) with high transmission power. For example, in FIG. 6B, P1 is peak power at a time T1.

Consequently, a peak-to-average power ratio (PAPR) becomes a higher value, which generates various disadvantages.

In general, the following problems are generated when the PAPR is a higher value.

In the design of an amplifier of the radio apparatus, a margin of the design must be made greater.

Since the peak output power becomes higher power, the efficiency of the amplifier is deteriorated.

Since the peak output power becomes higher power, power consumption is increased.

Because of these problems, it is important to constrain the PAPR to a lower level. In the W-CDMA system, since the positions of the control channels are identical and a greater peak is generated in the transmission power as described above, it is important to constrain the PAPR to a lower level.

For such problems, it is proposed to perform encoding with the use of codes with different code distances, which is one of an unequal error protecting method, to control such that transmission peak power of a multi-carrier modulation signal becomes a predetermined value or less (Japanese Patent Application Laid-Open Publication No. 2000-286818).

An invention described in Japanese Patent Application Laid-Open Publications No. H11-154904 and 2005-57610 are an invention relating to the transmission power/PAPR constraint.

An invention described in Japanese Patent Application Laid-Open Publication No. H11-154904 is intended to reduce the peak-to-average power ratio by time-multiplexing the pilot signal and the data signal to form channels and to reduce the number of orthogonal symbols used for forming the channels. The invention described in Japanese Patent Application Laid-Open Publication No. 2005-57610 is intended to sort the order of generated diffusion codes randomly to determine the order corresponding to each of a plurality of users.

3GPP Contribution (R1-050604), Sophia Antipolis, France, 20-21 Jun. 2005 proposes a format that is dispersedly arranged to be a common control channel and this is applied to the common control channel and high-speed users in scheduling dependent on a frequency channel.

However, in the invention described in Japanese Patent Application Laid-Open Publication No. 2000-286818, since codes must be selected to vary the minimum code distances, the code selection is restrained. Japanese Patent Application Laid-Open Publication Nos. H11-154904 and 2005-57610 do not refer to the increasing of the PAPR due to the accumulation of the power of the control channel. Therefore, the dispersed arrangement is not indicated which is performed by paying attention to the control channel. Although 3GPP Contribution (R1-050604), Sophia Antipolis, France, 20-21 Jun. 2005 describes that the dispersed arrangement is performed such that the transmission characteristics are improved at the time of high-speed movement, it is not indicated that the dispersed arrangement is performed to reduce the PAPR.

SUMMARY OF THE INVENTION

It is therefore the object of the present invention to provide a method of generating a frame format that can constrain the PAPR at a lower level without limitation of the code selection.

In order to achieve the above object, according to a first aspect of the present invention there is provided a radio communication system with each radio channel constituted by a control channel and a data channel, the radio communication system dividing a plurality of the radio channels in a frequency direction for mapping to a radio frame format, wherein a control signal position on the control channel is controlled in the radio frame format for each user or service to reduce peak transmission power or a peak-to-average power ratio of a radio communication apparatus. Preferably, from a plurality of the radio frame formats with the different control signal positions, the utilized radio frame format is selected at the time of connection setup. The utilized radio frame format may be changed dynamically by notifying the utilized radio frame format in advance. Scheduling may be performed for controlling the radio frame format based on channel quality information from terminals. The scheduling may include a transmission order and selection of a modulation mode used at least for the transmission. The terminals may be grouped for each utilized frame format and wherein the scheduling of the transmission order is performed correspondingly to the groups.

In order to attain the above object, according to a second aspect of the present invention there is provided a radio communication apparatus in a radio communication system with each radio channel constituted by a control channel and a data channel, the radio communication system dividing a plurality of the radio channels in a frequency direction for mapping to a radio frame format, the radio communication apparatus comprising a transmission power calculating unit that measures peak transmission power or a peak-to-average power ratio (PAPR); and a frame format controlling unit that controls the utilized radio frame format based on the calculation result of the transmission power calculating unit.

In order to attain the above object, according to a third aspect of the present invention there is provided a radio communication apparatus in a radio communication system with each radio channel constituted by a control channel and a data channel, the radio communication system dividing a plurality of the radio channels in a frequency direction for mapping to a radio frame format, the radio communication apparatus comprising a transmission power calculating unit that measures peak transmission power or a peak-to-average power ratio (PAPR) of the entire apparatus; an individual transmission power calculating unit that measures peak transmission power for each user or service, and a frame format controlling unit that controls the utilized radio frame format based on the calculation results of the transmission power calculating unit and the individual transmission power calculating unit. Preferably, the frame format controlling unit controls a control signal position on the control channel in the radio frame format for each user or service.

In order to attain the above object, according to a fourth aspect of the present invention there is provided a radio communication apparatus in a radio communication system with each radio channel constituted by a control channel and a data channel, the radio communication system dividing a plurality of the radio channels in a frequency direction for mapping to a radio frame format, the radio communication apparatus comprising a base band transmission power calculating unit that measures transmission signal power of a base band to calculate transmission power based on the measurement result; and a frame format controlling unit that controls the utilized radio frame format based on the calculation result of the transmission power calculating unit.

In order to attain the above object, according to a fifth aspect of the present invention there is provided a connection setting method in a radio communication system with each radio channel constituted by a control channel and a data channel, the radio communication system dividing a plurality of the radio channels in a frequency direction for mapping to a radio frame format, the method comprising sending a connection setting request from a radio network controller to a base transceiver station; based on the connection setting request, the base transceiver station selecting an unutilized radio frame format from a plurality of the radio frame formats with control signal positions on the control channel controlled for each user or service, and notifying a corresponding terminal of the selected radio frame format; and the terminal notifying the base transceiver station of the completion of the setting to start data transmission/reception with the use of the notified radio frame format. The base transceiver station may perform scheduling for controlling the radio frame format based on channel quality information from the terminal. The scheduling may include a transmission order and selection of a modulation mode used at least for the transmission. The base transceiver station may group the terminals for each utilized frame format and perform the scheduling of the transmission order correspondingly to the groups.

By applying the present invention, a peak of transmission power can be reduced. The PAPR can also be reduced. With the effects of the present invention, the operation point can be set higher without distorting the output of the amplifier and the power added efficiency of the amplifier can be improved. Consequently, power consumption can be reduced.

BRIEF DESCRIPTION OF THE DRAWINGS

The above and other objects, aspects, features and advantages of the present invention will become more apparent from the following detailed description when taken in conjunction with the accompanying drawings, in which:

FIGS. 7A and 7B are diagrams for describing the principle of the solution of the present invention;

FIG. 8 is a comparison diagram of the conventional case when a radio frame format is fixed in a radio channel used by each user and the case when the present invention is applied;

DESCRIPTION OF THE PREFERRED EMBODIMENTS

Embodiments of the present invention will now be described with reference to the accompanying drawings. The embodiments of the present invention are for the purpose of understanding the present invention and do not limit the technical field of the present invention.

Before describing the embodiments specifically, description will be made of basic features of the present invention to facilitate the understanding.

As shown in FIGS. 7A and 7B that describe the principle of the solution, the present invention is characterized in that positions of control channels (DPCCH) in radio frame formats are arranged dispersedly for each user or service.

In an example shown in FIGS. 7A and 7B, radio formats a to d are used which disperse the positions of the control channels for each of users 1 to 4.

Since this prevents the signal positions of the control channels (DPCCH) with high transmission power in a radio communication apparatus from overlapping, the peak transmission power can be reduced in a result of user-multiplexing. Specifically, as shown in FIG. 7B, for example, the peak transmission power is reduced at time T1 to become P1.

In this way, the peak power can be reduced. For example, in a base transceiver station acting as the radio communication apparatus, a peak for each user is dispersed in the user-multiplexing. Therefore, it is easily understood from a comparison diagram of the conventional case I when a radio frame format is fixed in a radio channel used by each user and the case II when the present invention is applied as shown in FIG. 8 that the peak power is reduced after multiplexing. Consequently, the PAPR is improved.

The position information of the control signal on the control channel can be accommodated by notifying to a communication destination when a radio connection is set or by notifying to a communication destination before changing.

Description will be made of each embodiment to which the features of the present invention are applied.

First Embodiment

In this embodiment, a radio format used at the time of connection setup is specified from a radio network controller (RNC) controlling a radio communication channel to a base transceiver station BTS by a terminal MS attempting to connect to the base transceiver station BTS under the control of the radio network controller (RNC).

Description will be made of the process thereof.

Figure 1:
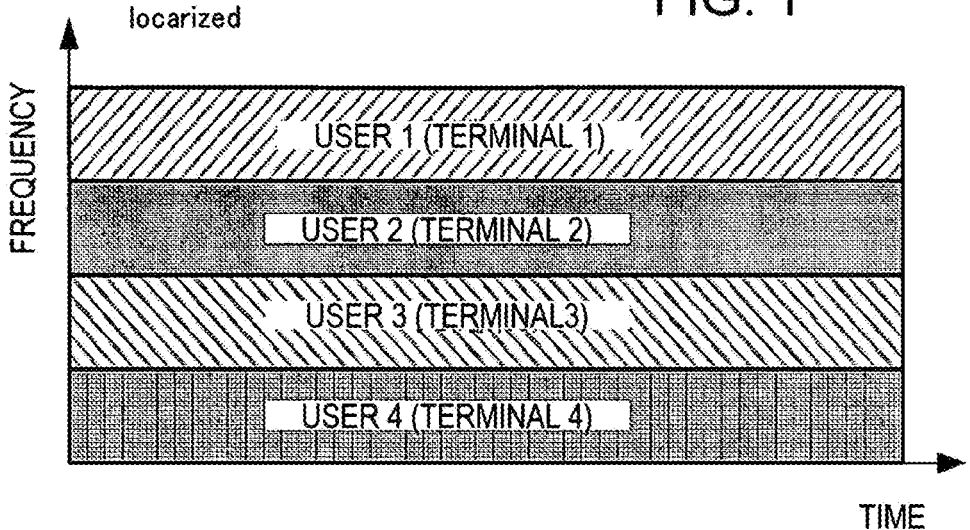
FIG. 1 is a diagram for localized describing OFDMA.
Figure 2:
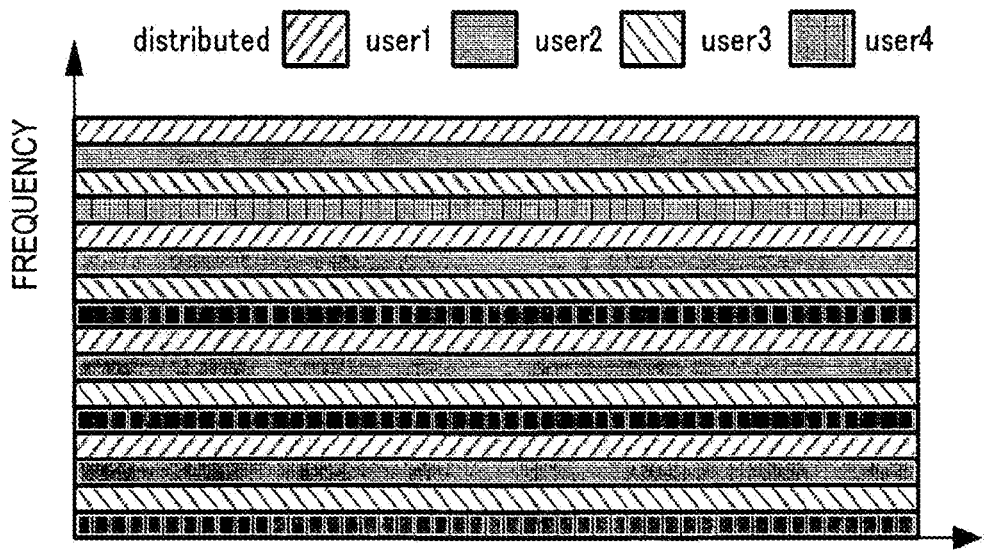
FIG. 2 is a diagram for describing distributed OFDMA.
Figure 3:
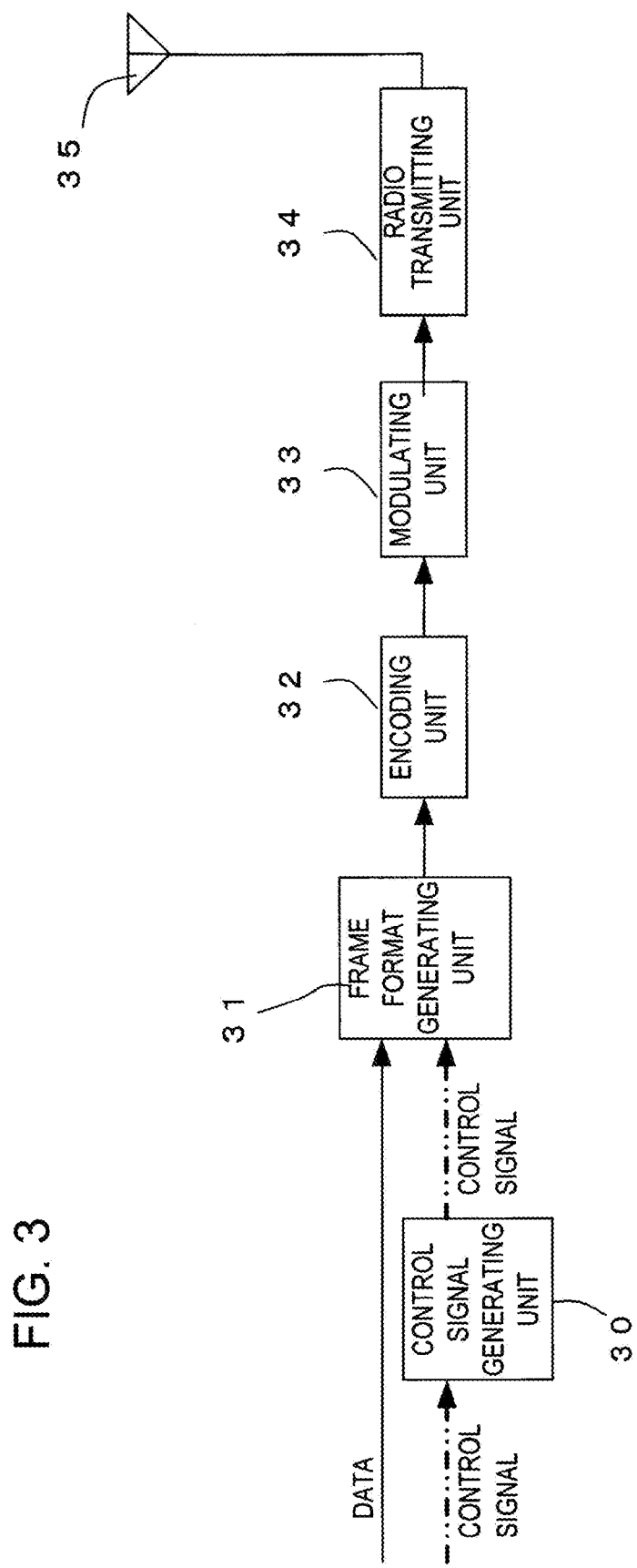
FIG. 3 is a block diagram of a base transceiver station configuration in a mobile radio system.
Figure 4:
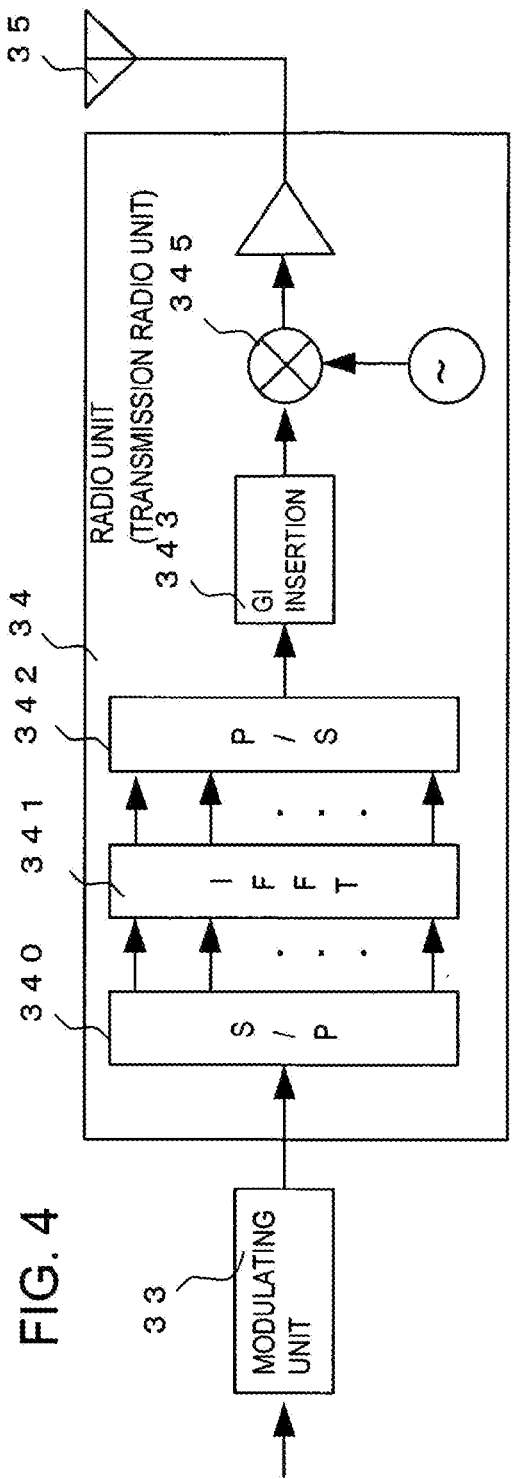
FIG. 4 shows a configuration example of a transmission radio unit and, specifically, a configuration example of an OFDM radio unit.
Figure 5:
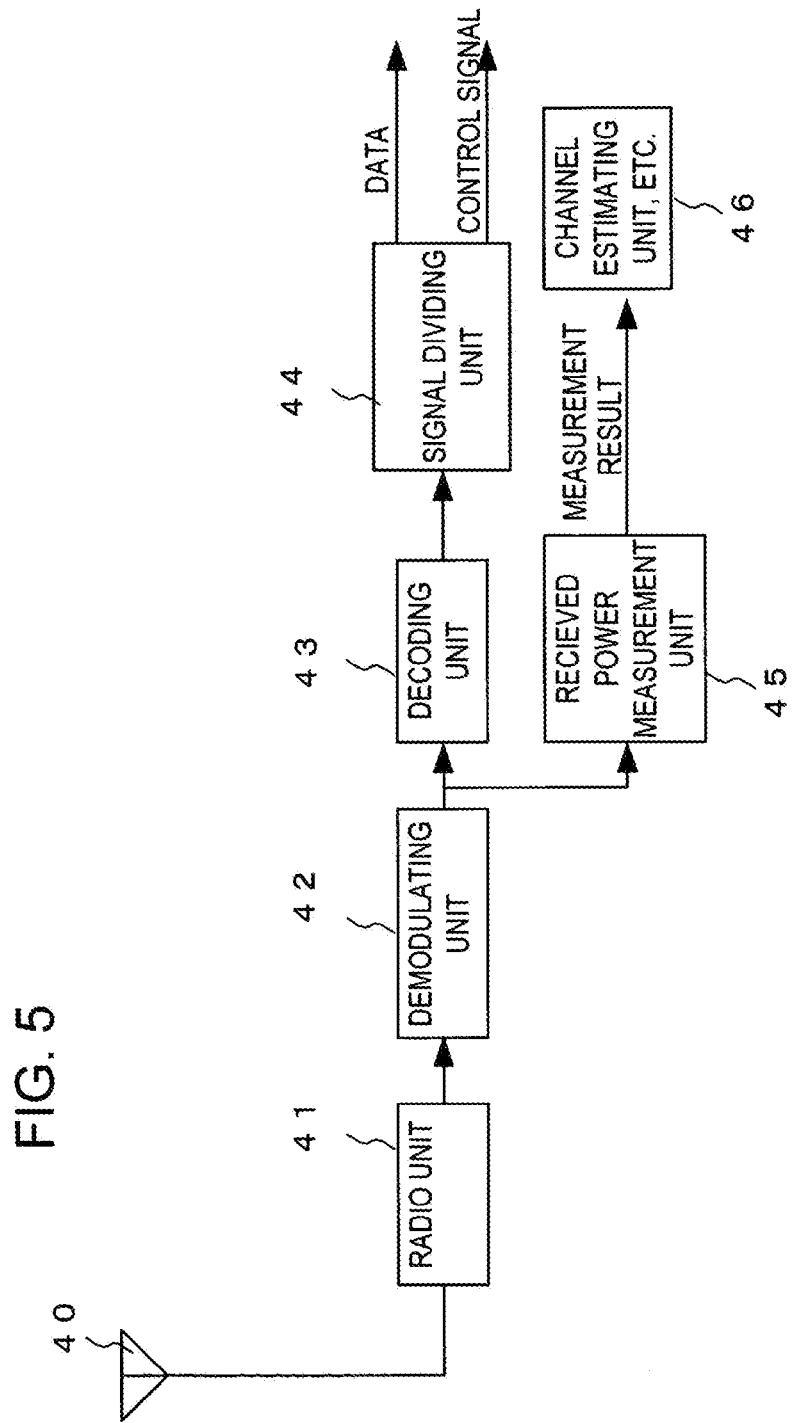
FIG. 5 shows a configuration example of a terminal corresponding to the configuration of the base transceiver station of FIG. 3.
Figure 6A:
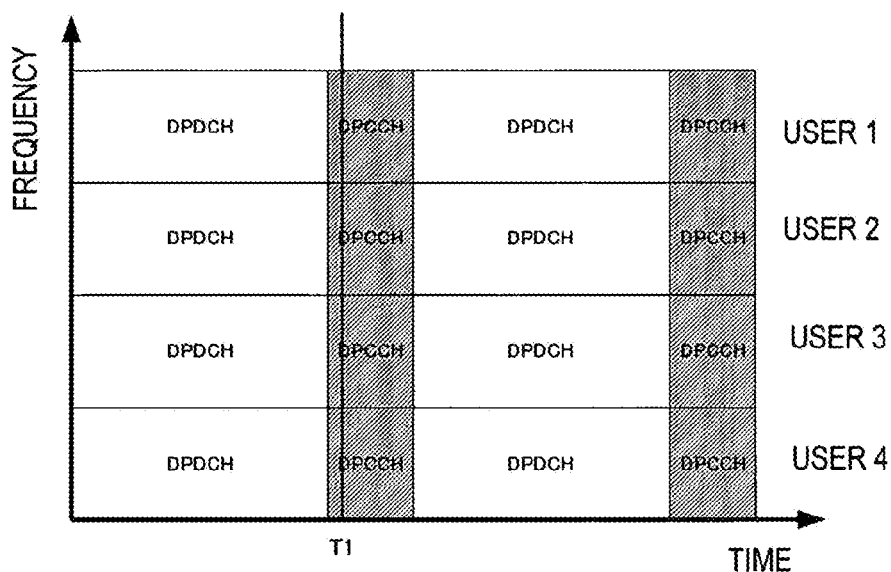
FIGS. 6A and 6B are diagrams for describing problems to be solved by the present invention.
Figure 6B:
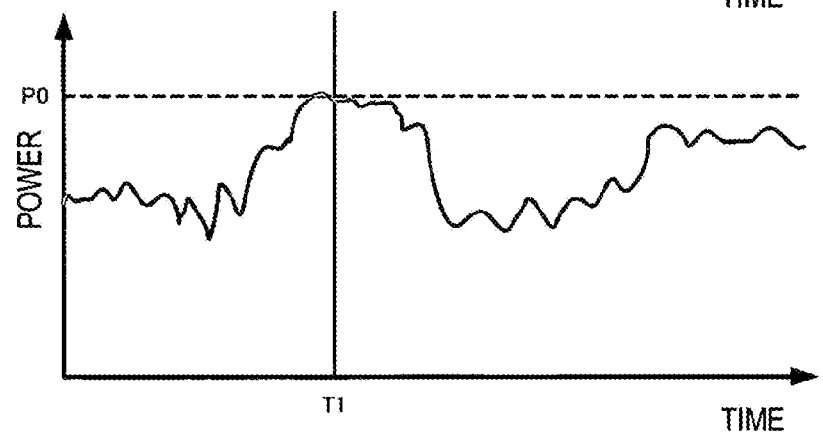
Figure 9:
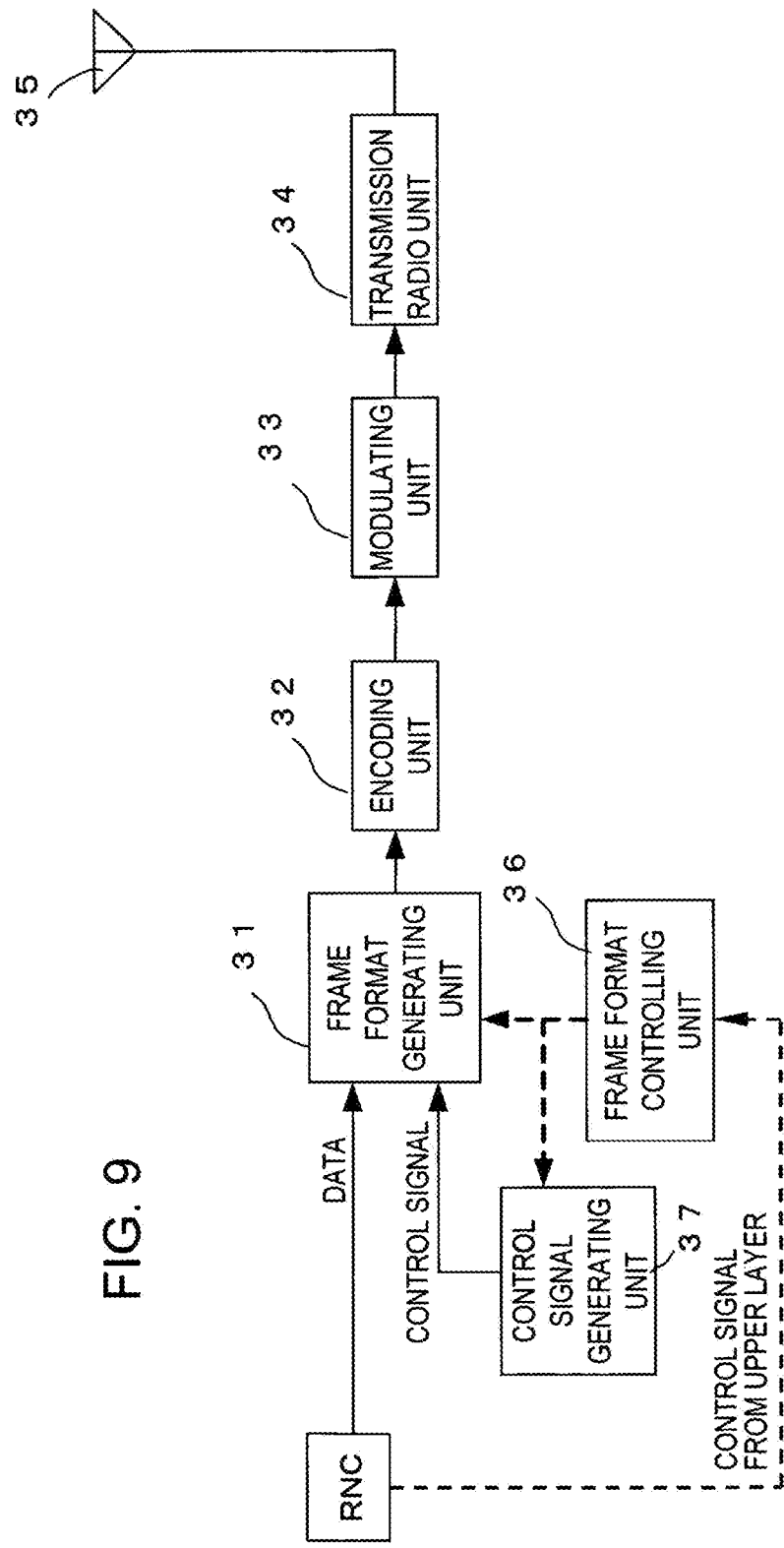
FIG. 9 is a block diagram of a configuration example of the base transceiver station BTS in an OFDM system according to the first embodiment.
Figure 11:
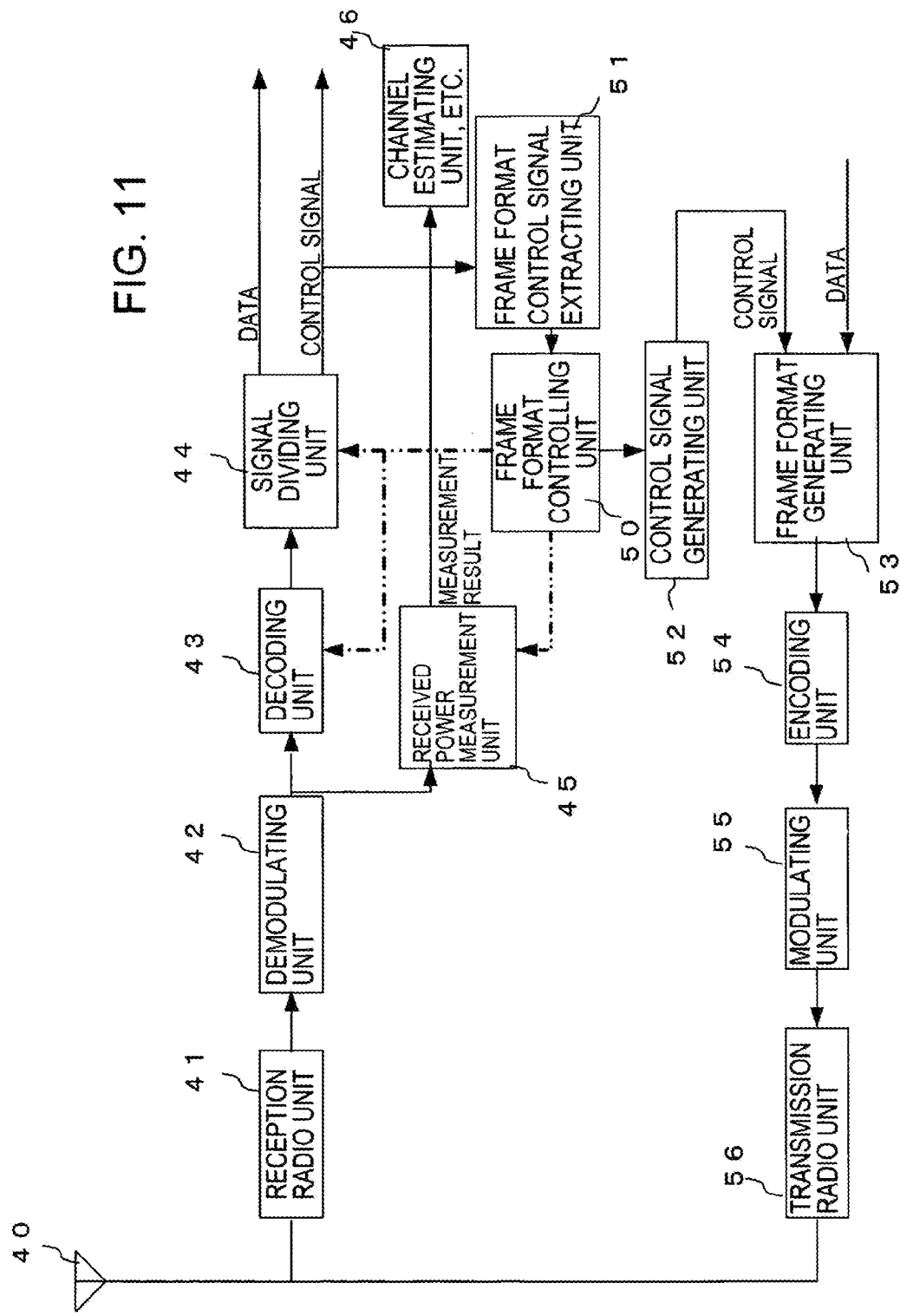
FIG. 11 is a block diagram of a configuration example of the terminal MS connecting to the base transceiver station BTS.

FIG. 9 is a block diagram of a configuration example of the base transceiver station BTS in an OFDM system according to a first embodiment. FIG. 11 is a block diagram of a configuration example of the terminal MS connecting to the base transceiver station BTS.

Figure 10:
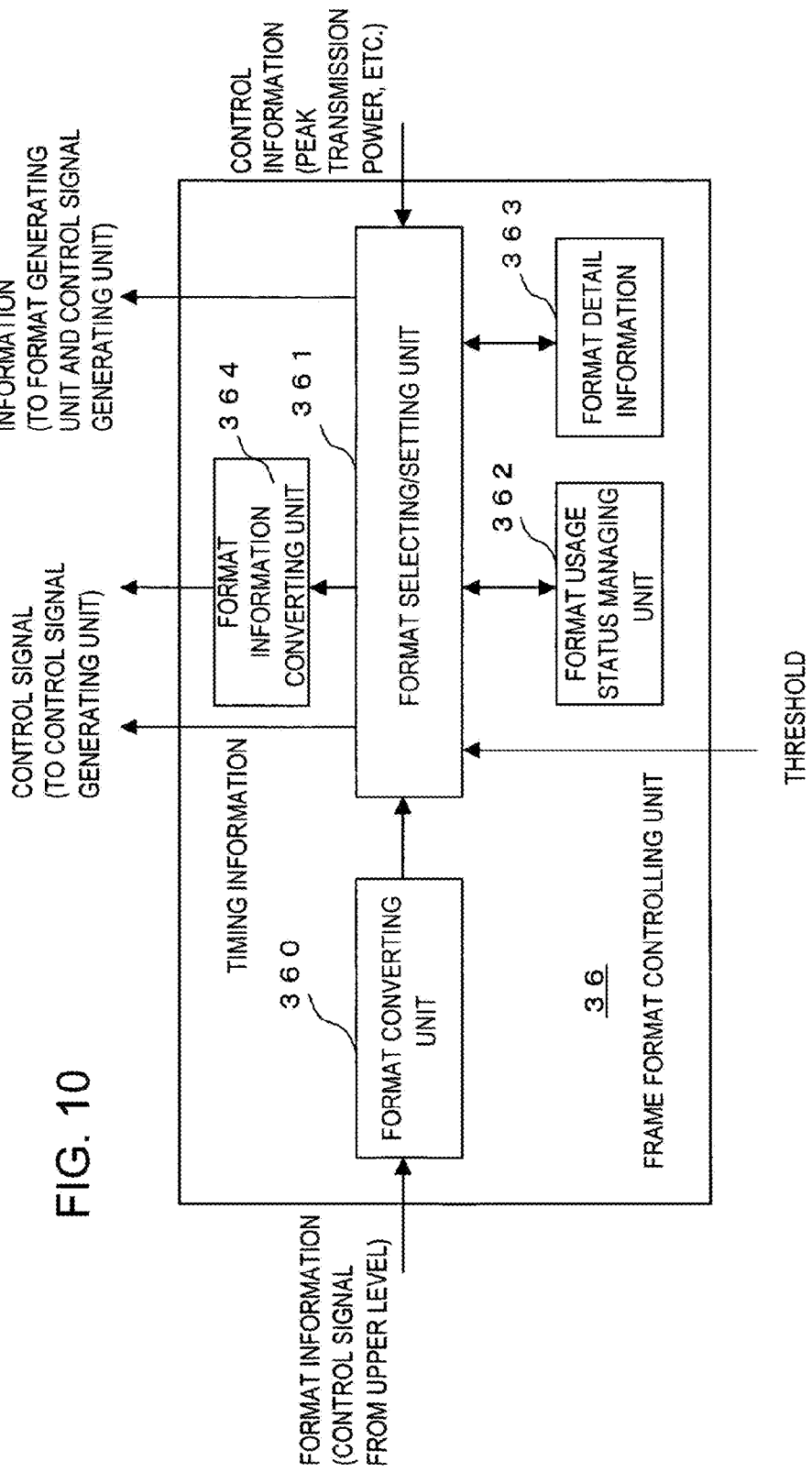
FIG. 10 is a block diagram of a configuration example of a frame format controlling unit of FIG. 9.
Figure 12:
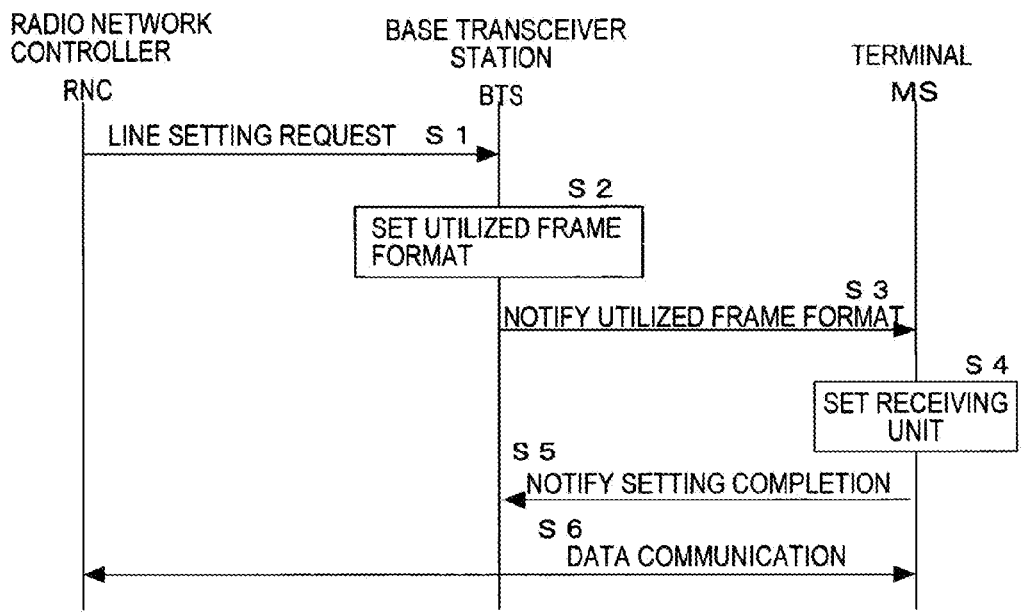
FIG. 12 is a process sequence flowchart corresponding to the first embodiment

FIG. 10 is a block diagram of a configuration example of a frame format controlling unit 36 of FIG. 9. FIG. 12 is a process sequence flowchart corresponding to the first embodiment.

An OFDMA system capable of four-user-multiplexing is taken as an example. The radio formats used in this case are assumed to be four types F1 to F4 shown in FIG. 13.

In a base transceiver station BTS under the control of one radio network controller RNC, radio formats are searched which are used in three channel already set. As a result, it is assumed that the format 1 (F1), format 2 (F2), and format 3 (F3) are used and the format 4 (F4) is not used.

The radio network controller RNC selects a format such that the peak transmission power is reduced when a connection is set to the new terminal MS. That is, in the example shown in FIG. 13, when the format 4 (F4) is not used and the format 4 (F4) is to be used, the format 4 (F4) is selected because the peak transmission power is not increased.

As shown in FIG. 12, the selected format 4 (F4) is notified from the radio network controller RNC to the base transceiver station BTS by format information in a connection setting request (step S1).

As shown in FIG. 10 in detail, when the format information is notified from the radio network controller RNC, the frame format controlling unit 36 in the base transceiver station BTS converts the format information with a format converting unit 360 to a format number, which is sent to a format selecting/setting unit 361.

As shown in later embodiments, the format selecting/setting unit 361 receives control information such as the peak transmission power obtained based on output of a transmission radio unit 34 and uses a format usage status and format detail information from a format usage status managing unit 362 and a format detail information setting unit 363 to select a frame format and determine change timing.

The format detail information from the format detail information setting unit 363 is the number of the transmission data bits, the number of control information bits, and the orders (mapping method) thereof in a frame format, for example.

The format usage status managing unit 362 stores and manages which frame format is used by which terminal MS.

As a result of the format selection as described above, the format selecting/setting unit 361 delivers the format detail information to a frame format generating unit 31, converts the selected frame format to a frame format number with a frame format information converting unit 364, and sends the detail information to a control signal generating unit 37.

When receiving the control signal, the format detail information, and the change timing information, the control signal generating unit 37 generates a control signal based on a control information length (the number of bits) and the format number.

When receiving the format detail information, the frame format generating unit 31 maps the control signal of the control channel and the (transmission) data of the data channel to the radio frame in accordance with the data and control signal lengths (the numbers of bits) and the mapping method (FIG. 12, step S2).

The mapped data are encoded by an encoding unit 32, modulated by the modulating unit 33, subjected to frequency conversion to a radio frequency by a transmission radio unit 34, and transmitted from an antenna 35 (step S3).

When the terminal MS receives this transmission, in the configuration of the terminal MS shown in FIG. 11, the signal received by an antenna 40 is subjected to frequency conversion by a reception radio unit 41 and is demodulated by a demodulating unit 42.

The result is decoded by a decoding unit 43 and the frame format control signal is extracted by a frame format extracting unit 51. The frame format of the received signal is set by a frame format controlling unit 50 based on the extracted frame format control signal.

The result is delivered to a signal dividing unit 44, a received power measurement unit 45, and the decoding unit 43 to perform the setting of a receiving unit (step S4).

In the terminal MS, if the setting of the utilized frame format is completed in the receiving unit, the frame format controlling unit 50 notifies a control signal generating unit 52 of the completion of the setting and, when receiving this notification, the control signal generating unit 52 adds a setting completion signal to the control signal, which is delivered to a frame format generating unit 53.

In the frame format generating unit 53, the control signal and the transmission data are mapped to the frame, modulated by a modulating unit 55, subjected to frequency conversion to a transmission frequency to adjust the transmission power, and transmitted from the antenna 40, and the completion of the setting is notified to the base transceiver station BTS (step S5).

In the base transceiver station BTS, the completion of the setting may also be notified to the radio network controller RNC.

In this way, when receiving the setting completion notification, the base transceiver station BTS or the radio network controller RNC can use the set radio format to perform data communication (step S6).

In this case, the utilized frame format is determined before setting the connection and the frame is used until the phone call is terminated.

The above process can reduce the peak power and improve the PAPR. In the design of the operation point of the amplifier, since the PAPR is reduced, the operation point does not have to be constrained to a lower level to generate output without distortion. In other words, a margin for the operation can be reduced without constraining the input signal power at a lower level. That is, the operation point can be set at a higher level.

Typically, the high power added efficiency of the amplifier is obtained at the operation point that distorts the output. However, as a result of the above control according to the present invention, the operation can be set at a higher level without distorting the output and the power added efficiency of the amplifier can be improved. As a result, power consumption can be reduced.

Although the localized OFDMA is described in the above description, the embodiment can be applied to a distributed OFDMA. The following embodiments can also be applied to the distributed OFDMA unless otherwise noted. The present invention is not limited to the application to the OFDMA.

Second Embodiment

Although the radio network controller RNC selects the utilized frame format and notifies the base transceiver station BTS of the format in the first embodiment, the base transceiver station BTS performs the selection in a second embodiment.

Figure 14:
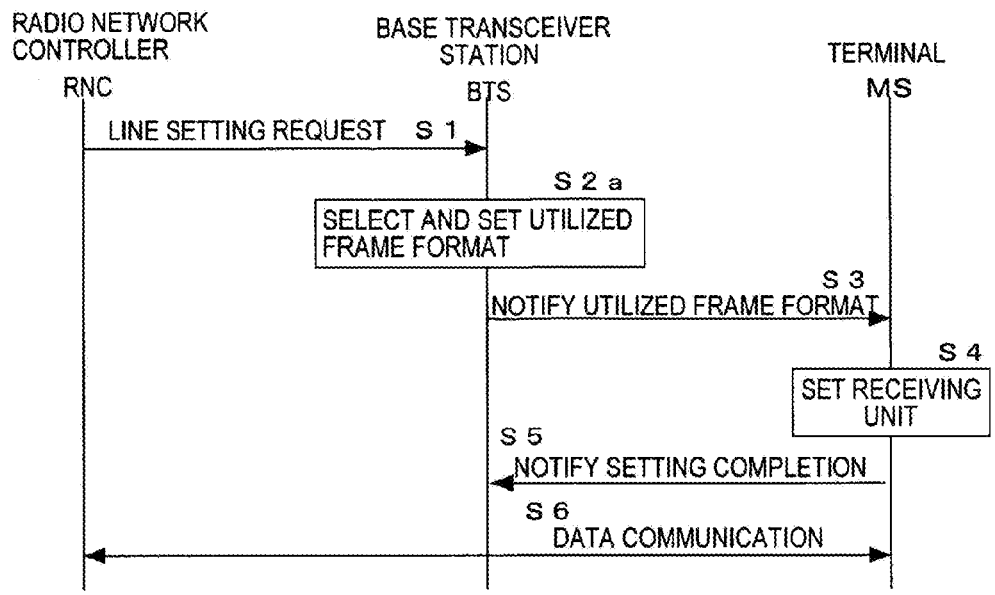
FIG. 14 is a process sequence flowchart according to the second embodiment.

FIG. 14 is a process sequence flowchart according to the second embodiment.

A connection setting request for one terminal MS is notified from the radio network controller RNC to the base transceiver station BTS (step S1). As described in FIG. 13, the base transceiver station BTS selects the utilized format from the frame formats that can be selected such that the peak transmission power is reduced after the user-multiplexing (step S2a). The result is notified to the terminal MS (step S3).

Subsequently, the processes same as the first embodiment (steps S4, S5) are performed for the communication (step S6). The selected frame format is used until the phone call is terminated. In this way, the same effects as the first embodiment are generated.

Although the base transceiver station BTS selects the utilized frame format in this description, in another aspect, the terminal MS can select the utilized frame format and notify the base transceiver station BTS of the result.

Third Embodiment

As is the case with the first and second embodiments, the utilized frame format is selected in the base transceiver station BTS when setting the connection. In consideration of the frame formats used by other connecting terminals MS, the utilized frame format is subsequently changed such that the transmission power peak is reduced.

It is assumed that a terminal MS selects the utilized frame format when setting the connection as is the case with the first and second embodiments and performs the communication. A connection request is assume to be notified from another terminal MS1 that is using the frame format 3 because of handover, etc. However, it is assumed that yet another terminal MS2 is using the frame format 3 and the frame format 1 is not used.

In this case, to constrain the overall transmission power peak in the base transceiver station, it is desirable that the terminal MS1 uses the frame format 1. Therefore, The utilized frame format of the terminal MS1 is changed from 3 to 1.

Figure 15:
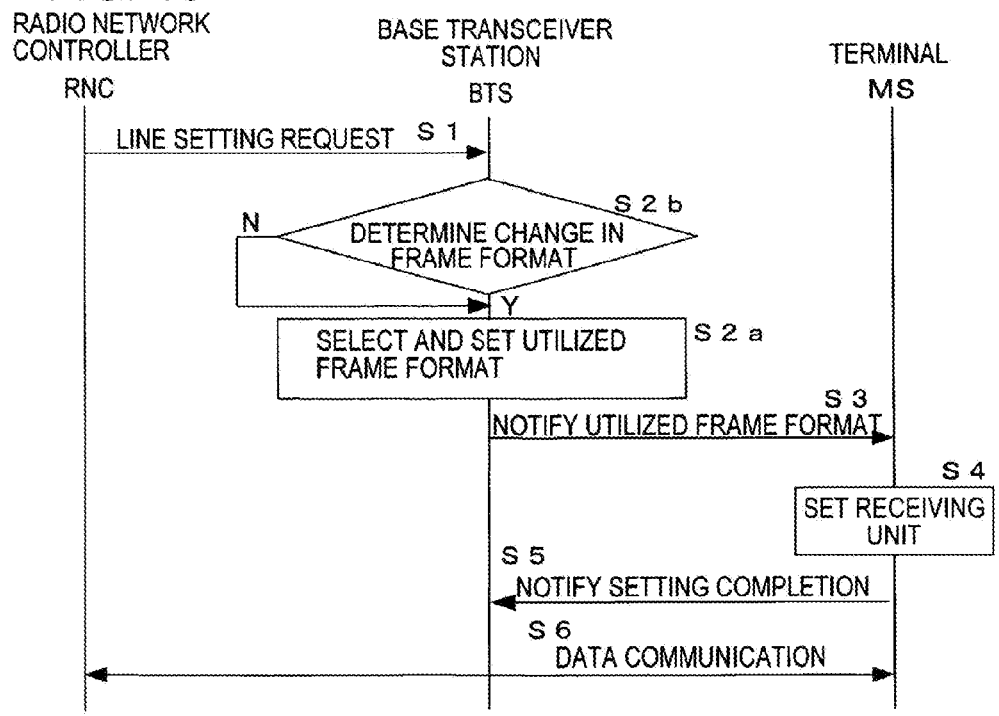
FIG. 15 is a process sequence flowchart according to the third embodiment.

Description will be made of the specific process of the third embodiment with reference to a process sequence flowchart shown in FIG. 15. In the frame format controlling unit 36 of the base transceiver station BTS shown in FIG. 9, it is determined whether the utilized frame format must be changed or not (step S2b). If it is determined that the frame format must be changed (step S2b, Y), the utilized frame format is selected such that the transmission power peak is reduced (step S2a). The result of the selection of the utilized frame format is notified to the terminal MS (step S3). The subsequent process steps S4 to S6 are the same as the first embodiment.

It is assumed that a phone call is terminated on yet another terminal MS3. As a result, if it is determined that the transmission power peak can be reduced by changing the utilized frame format, the same process as above is performed to change the frame format. The same process as the first embodiment is performed subsequently.

If the utilized frame format is changed, the change, the change timing, and the utilized frame format after the change are also notified to the transmission destination before the change timing, i.e., in advance.

As described above, by changing the utilized frame format, the peak transmission power can be reduced as is the case with the first embodiment.

Fourth Embodiment

Figure 16:
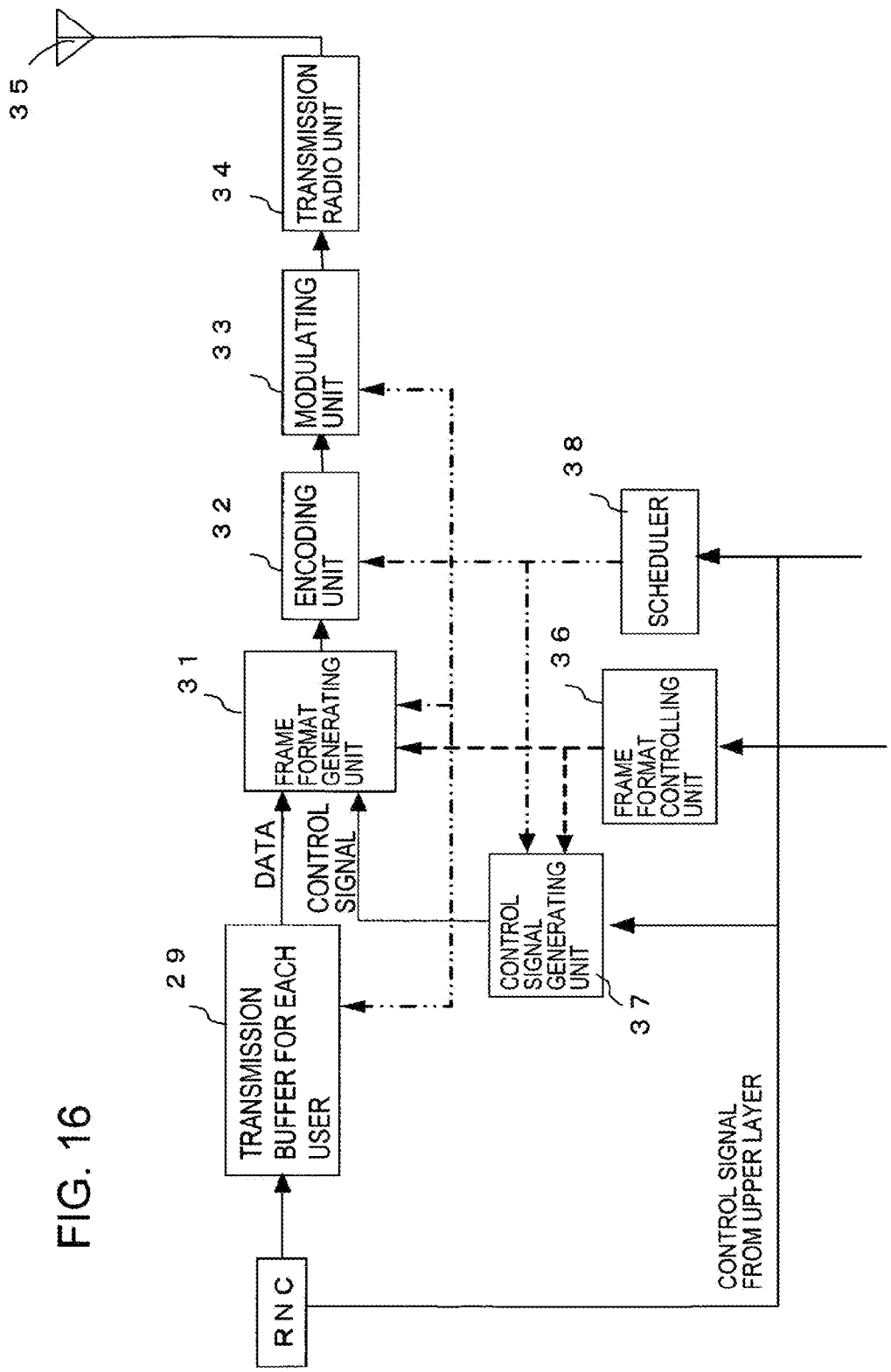
FIG. 16 is a block diagram of a configuration example of the base transceiver station apparatus to which the fourth embodiment is applied.
Figure 17:
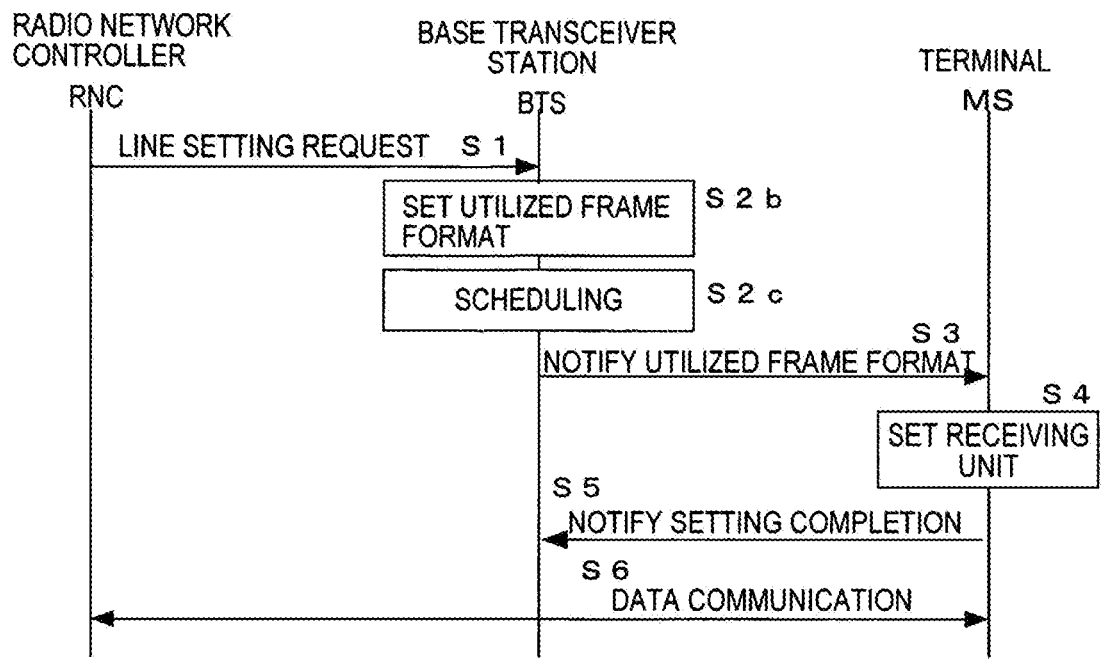
FIG. 17 is a process sequence flow corresponding to the fourth embodiment.

FIG. 16 is a block diagram of a configuration example of the base transceiver station apparatus to which a fourth embodiment is applied. FIG. 17 is a process sequence flow corresponding to the fourth embodiment.

Description will be made using the case that the utilized frame format is instructed from the radio network controller RNC, which is an upper-layer apparatus. The utilized frame format may be selected by the base transceiver station BTS (step S2b).

Figure 13:
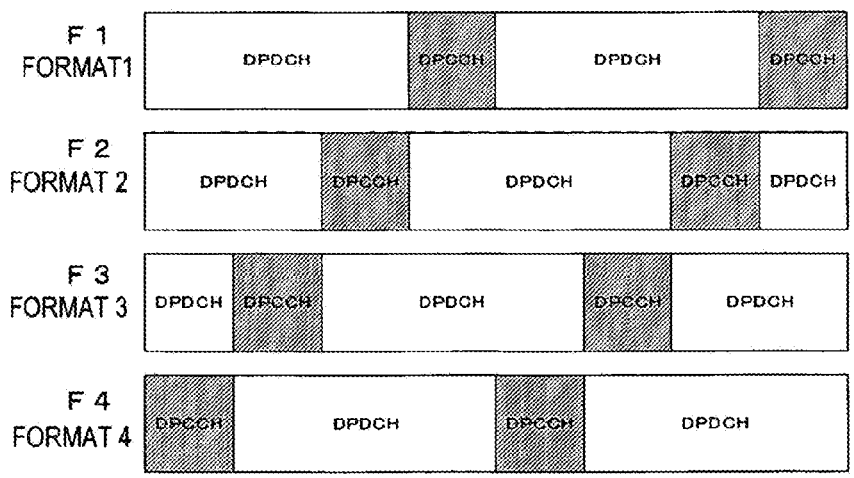
FIG. 13 is a diagram for describing an example of the radio format.

When the utilized frame format is instructed from the radio network controller RNC, the frame format controlling unit 36 checks an unutilized frame format from, for example, the four frame formats shown in FIG. 13 as is the case with the first embodiment, and the format information (e.g., format number) is notified to the control signal generating unit 37 and the frame format generating unit 31 concurrently.

When notified the utilized frame format from the radio network controller RNC, a scheduler unit 38 prioritizes the user transmission based on channel quality information CQI from terminals and transmits the data output from a transmission buffer 29 for each user in the order from the highest priority (step S2c). On this occasion, a modulation mode, etc. used for the transmission is selected and a transmission data size is determined in consideration of the utilized frame format. The encoding unit 32, the modulating unit 33, etc. are notified of information such as the selected modulation mode and encoding rate.

When notified the utilized frame format from the radio network controller RNC, the control signal generating unit 37 generates the control signal from the format information notified from the frame format controlling unit 36. The control signal is also generated and transmitted with the use of the data size, the modulation mode, etc. notified from the scheduler unit 38 (step S3).

The same processes as the first embodiment (steps S4 to S6) are subsequently performed. In this way, the same effects as the first embodiment are generated.

Although the utilized frame format is fixed, the frame format can be changed in accordance with the determination of the radio network controller RNC or the base transceiver station BTS after the setup.

Fifth Embodiment

Figure 18:
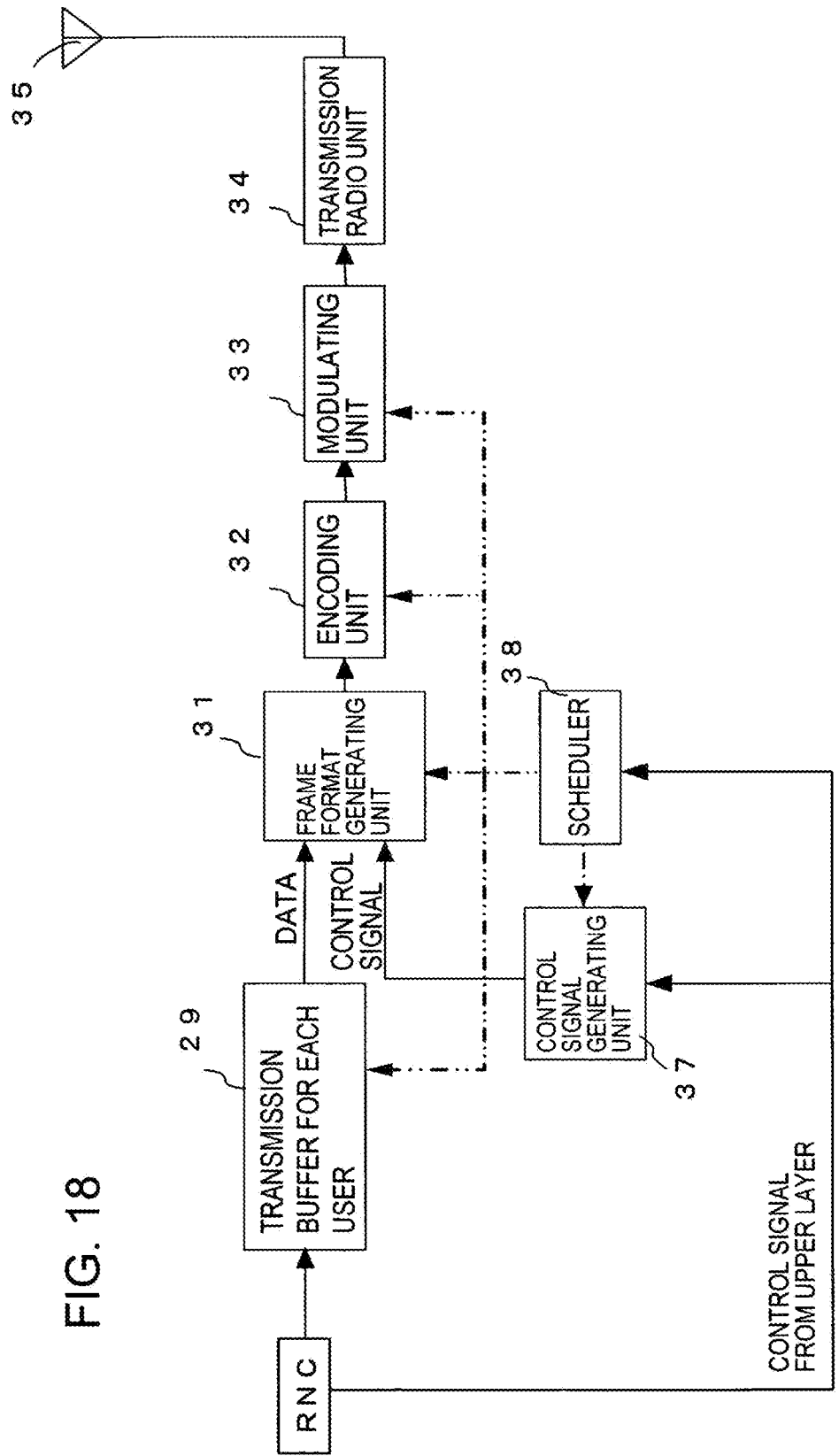
FIG. 18 shows a configuration example of the base transceiver station BTS corresponding to the fifth embodiment.
Figure 19:
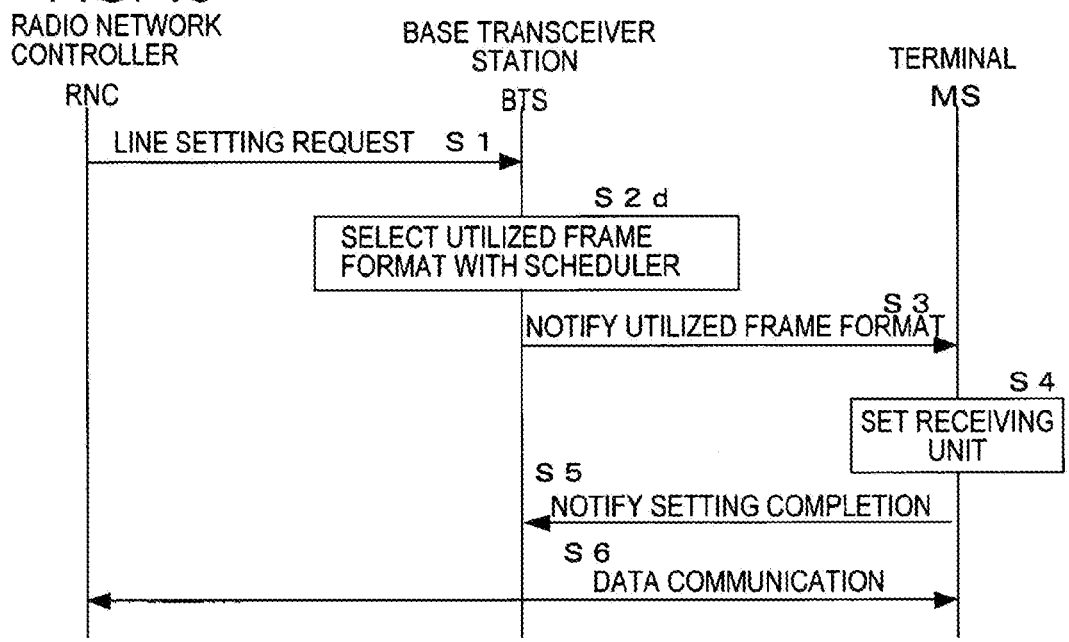
FIG. 19 is a process sequence flow of the fifth embodiment.

This embodiment is a configuration example for performing the processes in the first to fourth embodiments with a scheduler, and FIG. 18 shows a corresponding configuration example of base transceiver station BTS. FIG. 19 is a process sequence flow of the fifth embodiment.

When receiving a connection setting request from the radio network controller RNC (step S1), the base transceiver station BTS selects the utilized frame format in the scheduler unit 38 as is the case with, for example, the first embodiment, such that such that the transmission power peak is reduced after the user- or service-multiplexing (step S2d), and the result is notified to the terminal MS (step S3).

That is, for the terminals MS capable of the transmission, the priorities of the transmission is calculated based on the channel quality information (e.g., CQI or SIR) returned from the terminals MS, for example. This result is used to select which terminal the transmission is performed for and the scheduler unit 38 selects the modulating method such as QPSK, the transmission data size, the utilized frame format, and the encoding rate or encoding method (method of puncture, repetition, etc.) (step S2d).

The control signal is generated from the selected result and transmitted to the terminal MS (step S3). The same processes as the first embodiment (steps S4 to S6) are subsequently performed. In this way, the same effects as the first embodiment are generated.

During the connection, the scheduler unit 38 calculates priorities of the transmission to perform scheduling and monitors the peak transmission power at the same time, and if the scheduler unit 38 determines that the utilized frame format is needed to be changed, the utilized frame format after the change is also notified to the terminal MS.

The terminal subsequently performs the same process as the first embodiment to change the utilized frame format.

In this way, the same effects as the first embodiment are generated. If the change is not made, "no change" or "maintaining (or keeping) the status quo" may be transmitted.

Sixth Embodiment

In the fifth embodiment, the utilized frame format is selected at the time of the connection setup and the utilized frame format is changed by the scheduler unit capable of formatting.

On the other hand, in a sixth embodiment, the terminals MS are grouped for each frame format and the scheduling is performed for each group.

Figure 20:
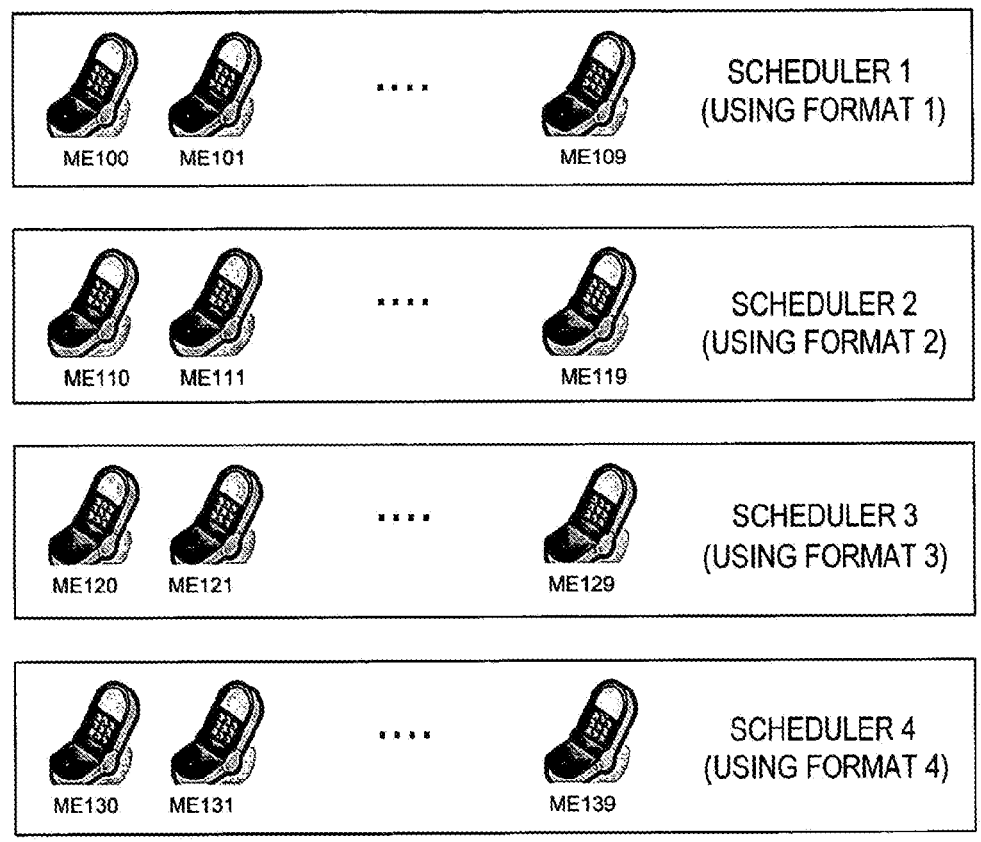
FIG. 20 is a diagram for describing the sixth embodiment.

Specifically, as shown in FIG. 20 describing the sixth embodiment, the terminals are grouped for each utilized frame format. The scheduler unit 38 is constituted by a plurality of schedulers corresponding to respective groups.

In FIG. 20:

Scheduler 1 (using format 1), terminals MS 100 to MS 109
Scheduler 2 (using format 2), terminals MS 110 to MS 119
Scheduler 3 (using format 3), terminals MS 120 to MS 129
Scheduler 4 (using format 4), terminals MS 130 to MS 139

For example, the scheduler 1 prioritizes the transmission based on the CQI of the terminals MS 100 to MS 109 and selects the terminal MS 101 having the highest priority.

The scheduler 2 prioritizes the transmission based on the CQI of the terminals MS 110 to MS 119 and selects the terminal MS 112 having the highest priority.

The scheduler 3 prioritizes the transmission based on the CQI of the terminals MS 120 to MS 129 and selects the terminal MS 122 having the highest priority.

The scheduler 4 prioritizes the transmission based on the CQI of the terminals MS 130 to MS 139 and selects the terminal MS 133 having the highest priority.

For each selected terminal MS, the modulation mode, data size, encoding rate, etc. are selected as described above, and the control signal is generated and transmitted to the corresponding terminal MS. The data for each terminal are then multiplexed and the data are transmitted to each terminal. Each format is combined such that the transmission power peak is reduced after the multiplexing.

Although one terminal is selected in each of the four groups, the terminal can be selected in any manner as long as the transmission power peak is reduced after the multiplexing.

In the above description, the grouping is performed based on the selected frame formats. However, if the utilized frame format is changed as described above, the groups can be changed in accordance with the changed frame formats to perform the same process.

Specifically, it is assumed that the utilized frame format of one terminal MSi is the frame format 1 at the time of the connection setup and that the terminal MSi belongs to the group of the scheduler 1. It is also assumed that the utilized frame format is changed to reduce the peak transmission power and that the frame format 2 is to be utilized. In this case, the terminal MSi is migrated from the group of the scheduler 1 to the group of the scheduler 2 and if the utilized frame format is not needed to be changed in the same way, the terminal MSi belongs to that group.

By performing the above process, the same effects as the first embodiment are generated.

Seventh Embodiment

The present invention has an aspect of a method of notifying the utilized frame format information, and in the first to sixth embodiments, the selected frame format information is symbolized and transmitted as follows.

Numbers are added to the frame formats and the numbers are defined by, for example, four-bit signals as shown in table 1, which serve as indices indicating the utilized frame formats.

These are used as the control signals from the base transceiver station BTS to the terminals MS or from the radio network controller RNC to the base transceiver station BTS and the terminals MS.

The utilized frame format can be set and changed by performing the first to sixth embodiments and embodiments described later with the use of these signals.

If the utilized frame format is not changed, the control signal may be transmitted which is defined as all "0" as shown in table 1, for example. Although four-bit signals are used in the example of table 1, the signal may have at least three bits.

TABLE 1

| Format | Control Signal |
| --- | --- |
| no change | 0000 |
| format 1 | 0001 |
| format 2 | 0010 |
| format 3 | 0011 |
| format 4 | 0100 |

Eighth Embodiment

In this embodiment, when the utilized frame format is changed in the third embodiment, the transmission power is measured by feeding back the transmission power at the end of the antenna and the utilized frame format is changed based on the result thereof.

Figure 21:
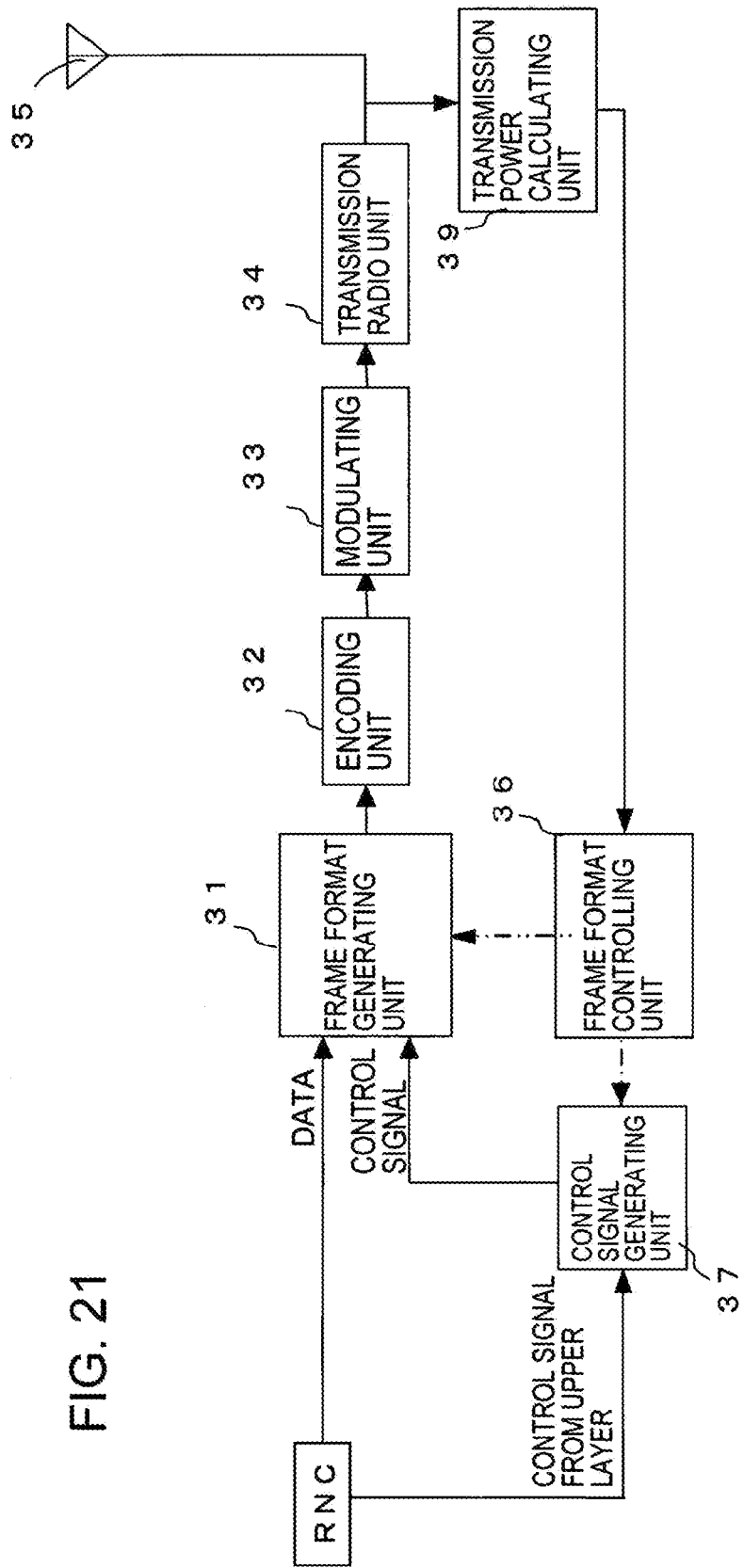
FIG. 21 shows a configuration example of the base transceiver station BTS corresponding to the eighth embodiment.

FIG. 21 is a configuration example of the base transceiver station BTS corresponding to the eighth embodiment. The output power of the transmission radio unit 34 is measured and/or calculated by a transmission power calculating unit 39. Based on this result, the frame format controlling unit 36 performs control such that the peak transmission power is reduced. If it is determined that the format must be changed to reduce the peak transmission power, one or more frame formats used by one or more terminals are changed as is the case with the first embodiment.

In this way, the same effects as the first embodiment are generated.

Ninth Embodiment

In the eighth embodiment, a threshold Ppth is further set in the peak transmission power. When comparing with the measured peak transmission power Pp in the frame format controlling unit, if the peak transmission power Pp is greater than the threshold Ppth, the utilized frame format is changed.

Figure 22:
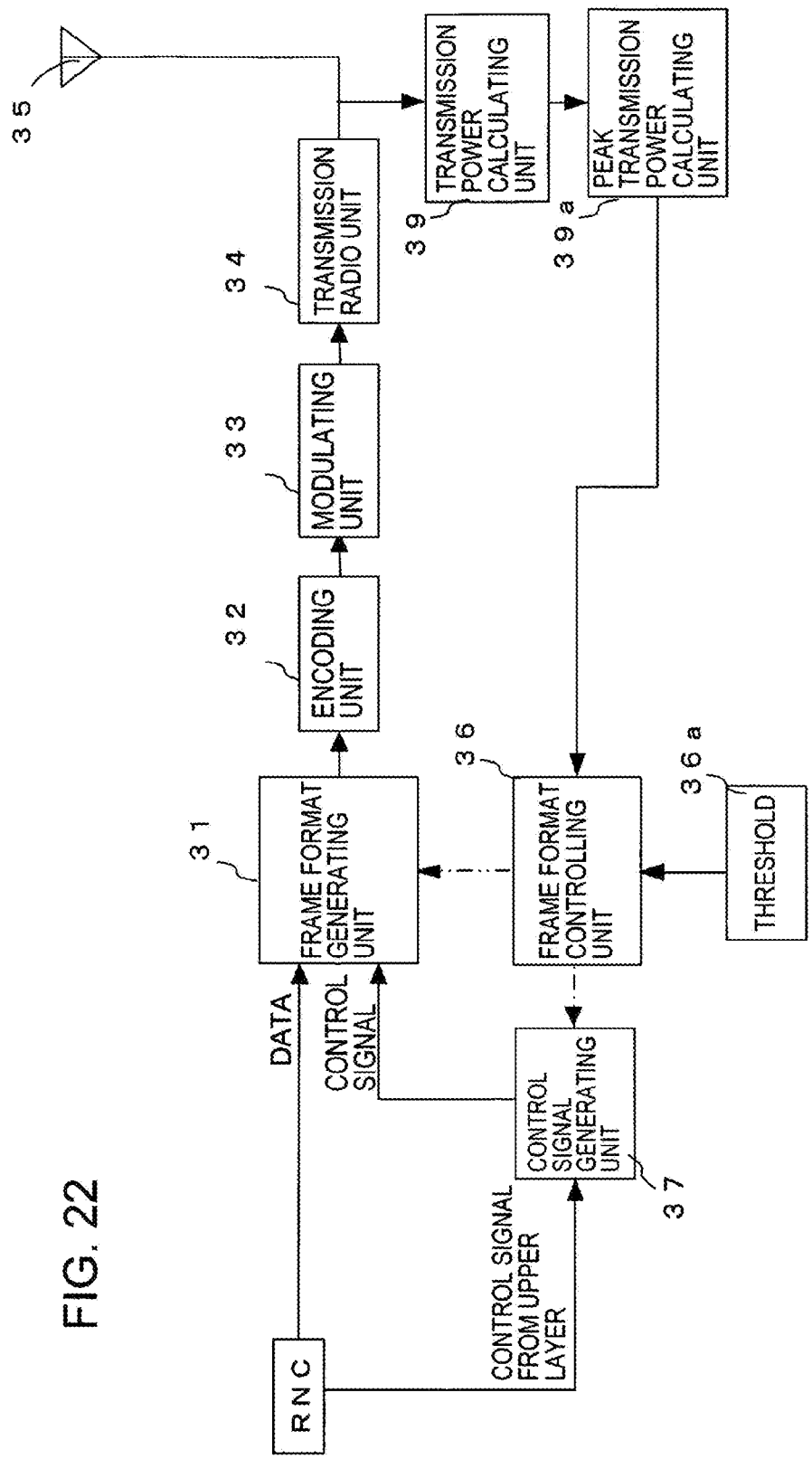
FIG. 22 shows a configuration example of the base transceiver station BTS corresponding to the ninth embodiment.
Figure 23:
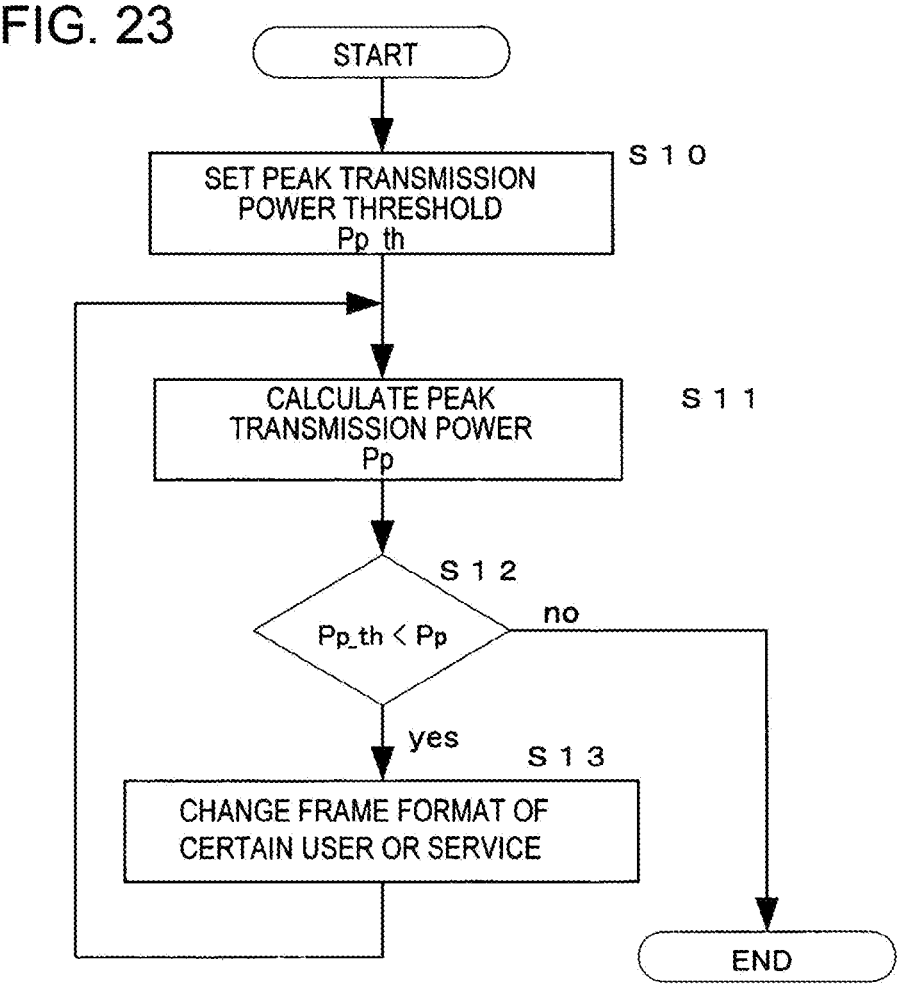
FIG. 23 shows an example of a process flow of the ninth embodiment.
Figure 24:
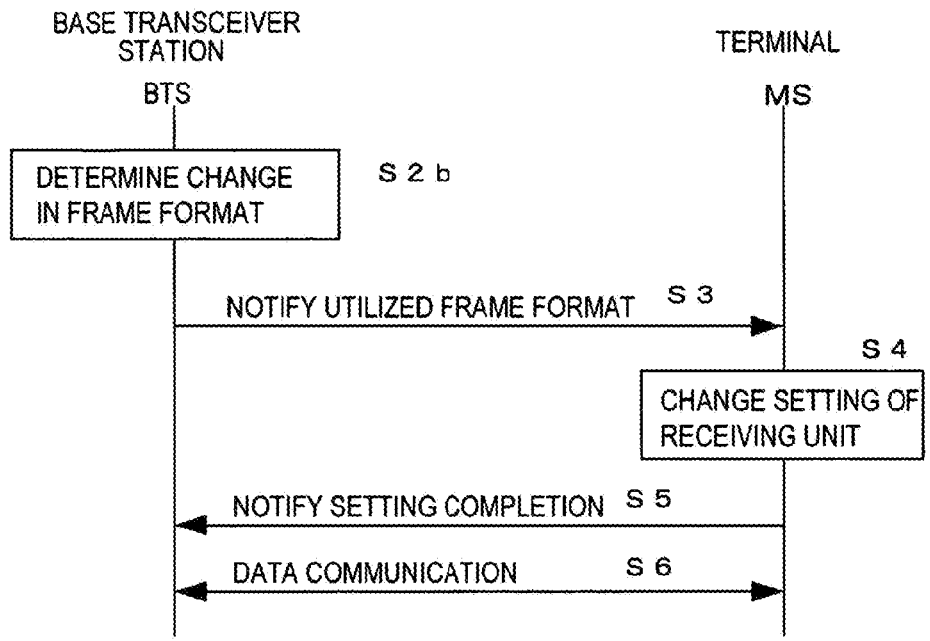
FIG. 24 shows a process sequence of the ninth embodiment.
Figure 25:
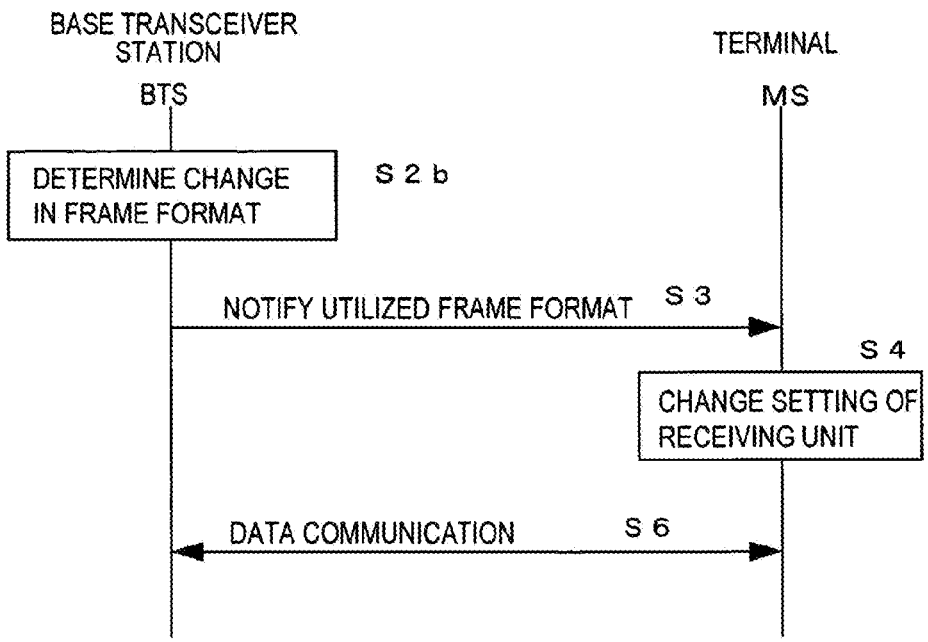
FIG. 25 shows another process sequence of the ninth embodiment.

FIG. 22 is a configuration example of the base transceiver station BTS corresponding to a ninth embodiment, FIG. 23 is an example of a process flow of the ninth embodiment; and FIGS. 24 and 25 are process sequences.

When the base transceiver station BTS is activated or when the connection is established, a peak transmission power threshold Pp_th (36a) is set (step S10). The output power of the transmission radio unit 34 is calculated by an output power calculating unit 39. The peak transmission power calculating unit 39 stores the measurement result of the output power calculating unit 39, for example, from time T to time T+t to measure and/or calculate the peak transmission power Pp (step S11).

The result and the peak transmission power threshold Pp_th are compared by the frame format controlling unit 36 (step S12) and if the peak transmission power Pp is greater than the threshold Pp_th (step S12, Yes), it is determined that the utilized frame format is needed to be changed.

If it is determined that the format is needed to be changed, one or more frame formats used by one or more terminals are changed such that the peak transmission power is reduced (step S13).

Specifically, in the sequence flow of FIG. 24, for example, the utilized frame format is changed for a terminal using the format that has the highest transmission power at the time of the peak transmission power (step S2b). Once the terminal to be changed is determined, the terminal is notified of the utilized frame format (step S3). The notified terminal changes the setting of the receiving unit (step S4) and transmits the setting completion notification to the base transceiver station (step S5).

After receiving the completion notification, the base transceiver station BTS uses the changed frame format to perform the transmission (step S6).

In this way, the peak transmission power can be reduced and the same effects as the first embodiment can be obtained.

As shown in FIG. 25, the terminal MS may not return the setting completion notification to the base transceiver station BTS (step S5). Specifically, the change timing is notified along with the frame format notification from the base transceiver station BTS to the terminal MS. The terminal receiving the change timing performs the change at the instructed change timing. In this way, the setting completion notification can be omitted.

Tenth Embodiment

Although the utilized frame format is controlled using the peak transmission power in the ninth embodiment, the utilized frame format is controlled using the PAPR in this embodiment.

Figure 26:
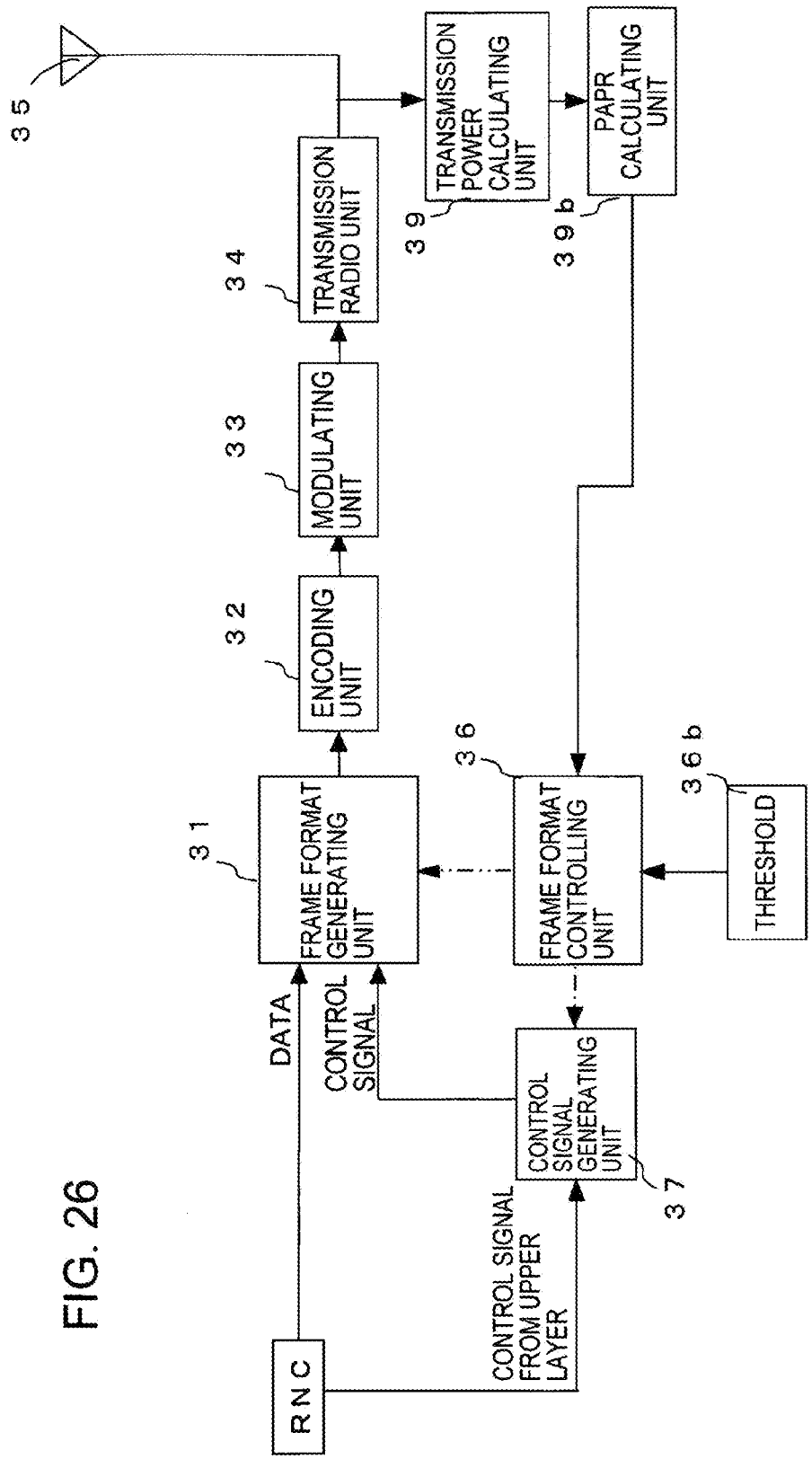
FIG. 26 shows a configuration example of the base transceiver station corresponding to the tenth embodiment.
Figure 27:
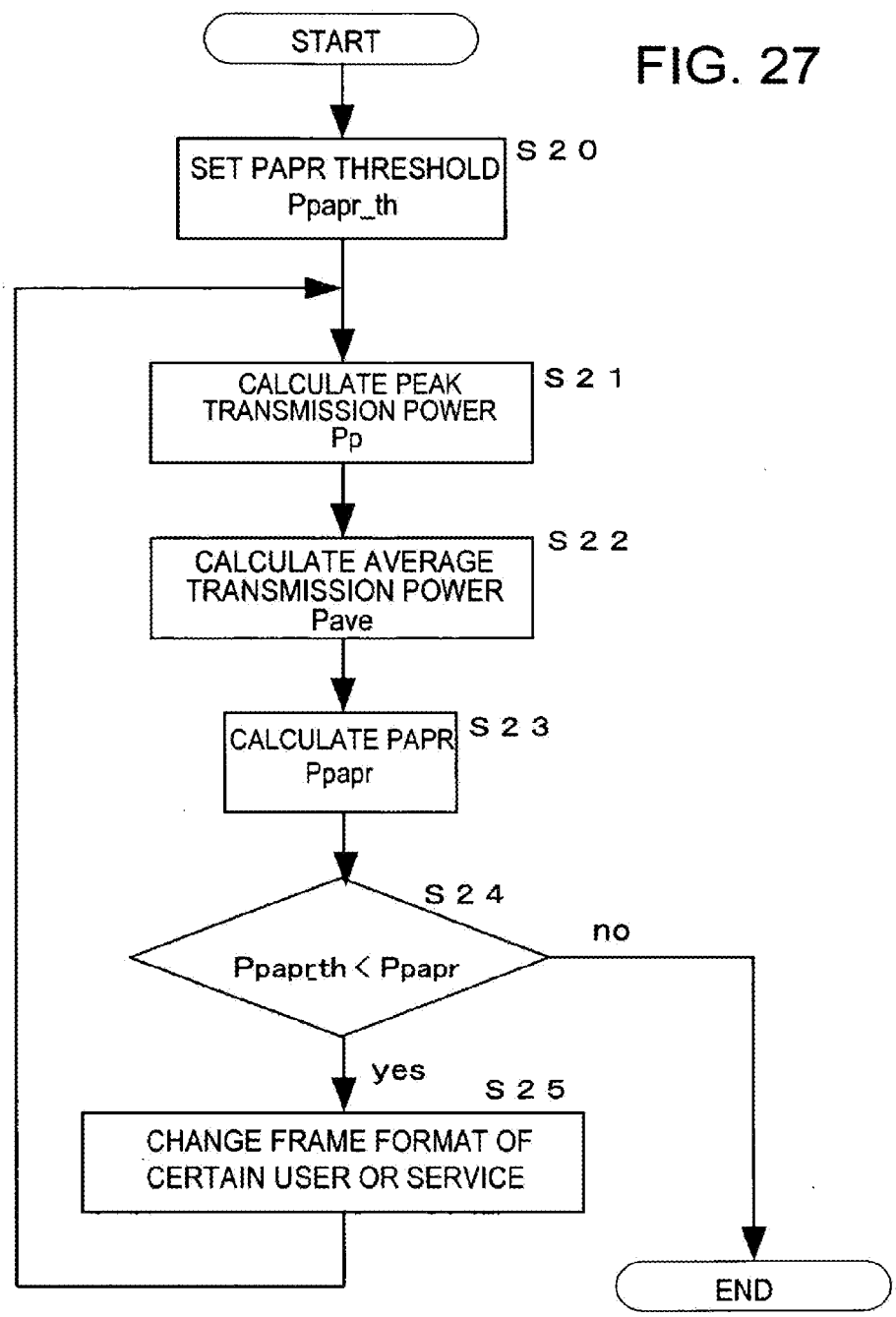
FIG. 27 shows an example of a process flow of the tenth embodiment.

FIG. 26 shows a configuration example of the base transceiver station corresponding to a tenth embodiment and FIG. 27 shows the process flow example thereof.

When the base transceiver station is activated or when the connection is established, a PAPR threshold Ppapr_th (36b) is set (step S20).

The output power of the transmission radio unit 34 is measured and calculated by the transmission power calculating unit 39. A PAPR calculating unit 39b stores the measurement result of the transmission power calculating unit 39, for example, from time T to time T+t to calculate the peak transmission power Pp (step S21) and an average transmission power Pave (step S22), which are used to calculate Ppapr (step S23).

The calculation result Ppapr and the PAPR threshold Ppapr_th (26b) are compared by the frame format controlling unit 36 (step S24). If the calculation result Ppapr is greater than the threshold Ppapr_th, it is determined that the utilized frame format is needed to be changed (step S25).

If it is determined that the format is needed to be changed, one or more frame formats used by one or more terminals are changed such that the PAPR is reduced. Specifically, for example, the utilized frame format is changed for a terminal MS using the format that has the highest transmission power at the time of the peak transmission power.

Once the terminal to be changed is determined, the terminal MS is notified of the utilized frame format. The notified terminal changes the setting of the receiving unit and transmits the setting completion notification to the base transceiver station BTS.

After receiving the completion notification, the base transceiver station BTS uses the changed frame format to perform the transmission.

In this way, the peak transmission power can be reduced; the PAPR is reduced consequently; and the same effects as the first embodiment can be obtained.

Eleventh Embodiment

In the ninth and tenth embodiments, the frame format control is performed by the scheduler unit 38.

Figure 28:
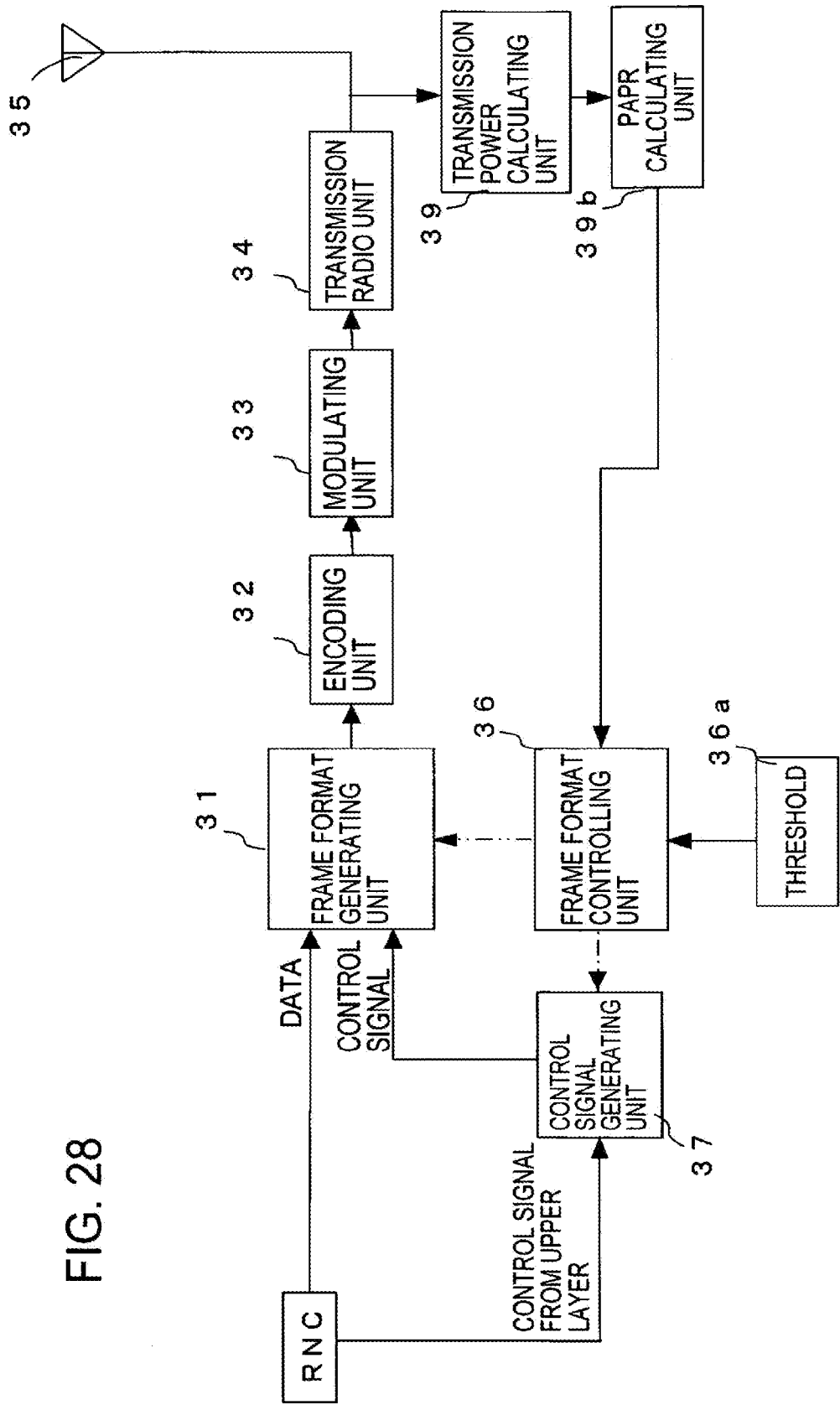
FIG. 28 shows a configuration example of the base transceiver station BTS corresponding to the tenth embodiment.

Description will be made of the case of the ninth embodiment. FIG. 28 shows a configuration example of the base transceiver station BTS corresponding to the tenth embodiment.

When the base transceiver station BTS is activated or when the connection is established, a peak transmission power threshold Pp_th (36a) is set.

The output power of the transmission radio unit 34 is calculated by an output power calculating unit 39. The peak transmission power calculating unit 39b stores the measurement result of the transmission power calculating unit 39, for example, from time T to time T+t to calculate the peak transmission power Pp. The result and the peak transmission power threshold Pp_th (36a) are compared by the scheduler unit 38 and if the peak transmission power Pp is greater than the threshold Pp_th, it is determined that the utilized frame format is needed to be changed.

If it is determined that the format is needed to be changed, one or more frame formats used by one or more terminals are changed such that the peak transmission power is reduced. Specifically, the utilized frame format is changed for a terminal using the format that has the highest transmission power at the time of the peak transmission power.

Once the terminal MS to be changed is determined, the terminal MS is notified of the utilized frame format. The notified terminal MS changes the setting of the receiving unit and transmits the setting completion notification to the base transceiver station BTS.

After receiving the completion notification, the base transceiver station BTS uses the changed frame format to perform the transmission.

In this way, the peak transmission power can be reduced and the same effects as the first embodiment can be obtained.

Although the selected format has the highest transmission power in the above description, the formats having the highest to the predetermined mth-highest transmission power may be selected to be changed. Alternatively, when the highest transmission power is selected and the transmission is performed, if the peak transmission power thereof is greater than the peak power transmission power threshold, the same process is performed. In this way, the process can be repeated until the peak transmission power becomes lower than the peak transmission power threshold.

Twelfth Embodiment

Figure 29:
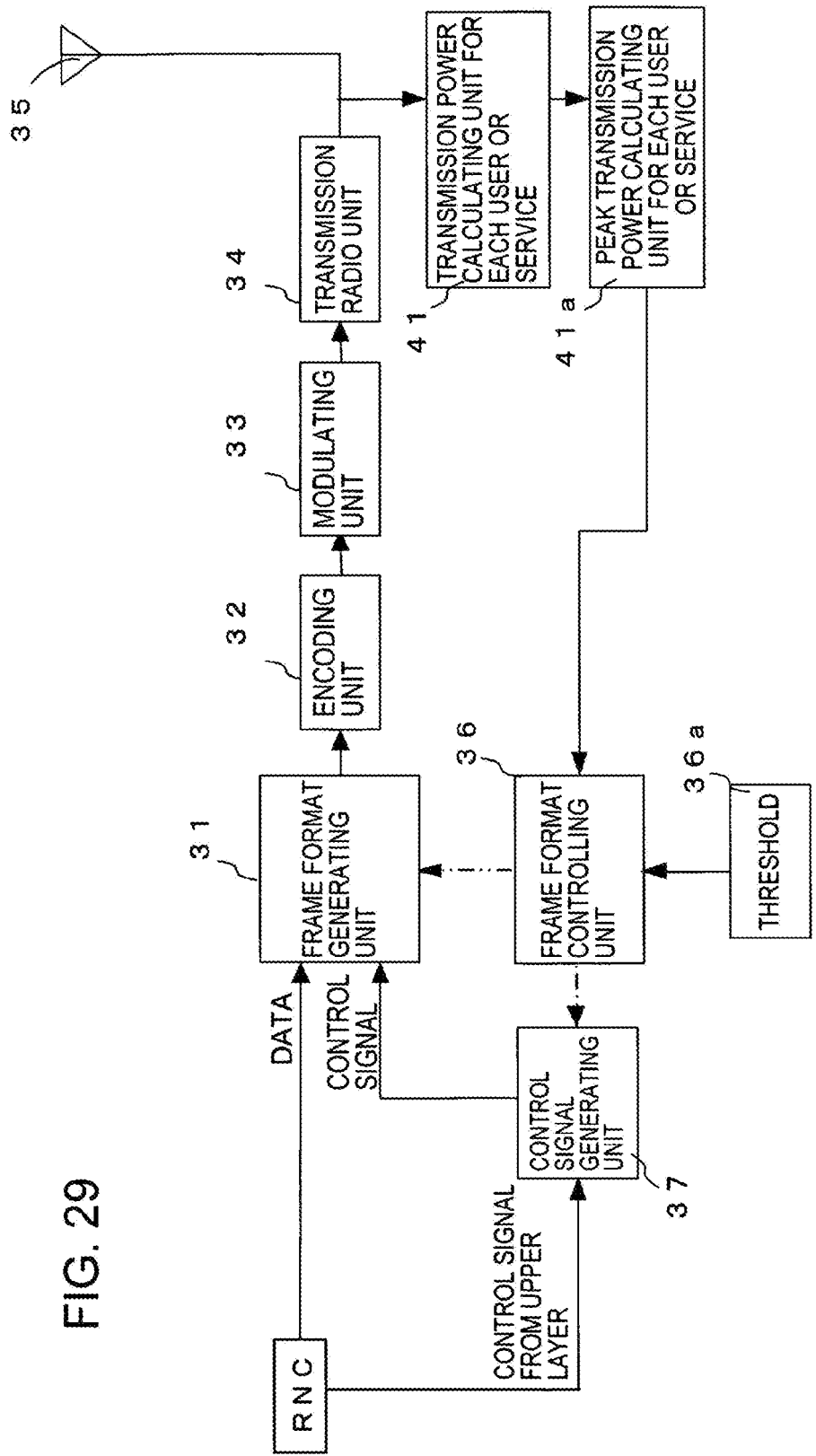
FIG. 29 shows a configuration example of the base transceiver station BTS corresponding to the twelfth embodiment.
Figure 30:
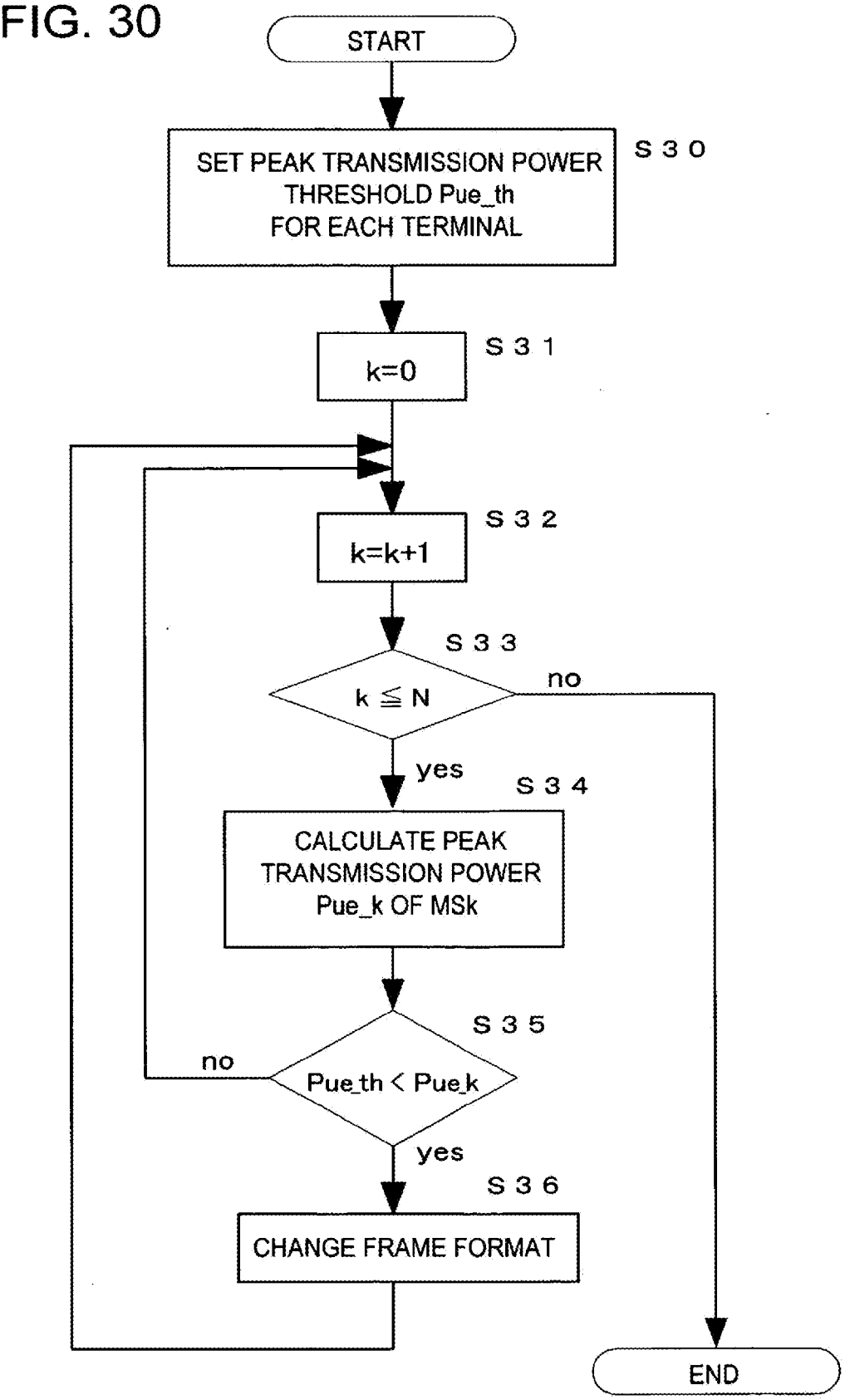
FIG. 30 shows an example of a process flow corresponding to the twelfth embodiment.

The peak transmission power is reduced for each user or service. FIG. 29 shows a configuration example of the base transceiver station BTS corresponding to a twelfth embodiment and FIG. 30 shows an example of the process flow thereof.

When the base transceiver station BTS is activated or when the connection is established, a peak transmission power threshold Pue_th (36a) is set for each user or service (step S30). The output of the transmission radio unit 34 is subjected to frequency separation for each user or service, for example, by a filter (not shown in FIG. 29), and the transmission power for each user or service is measured or calculated by a transmission power calculating unit 41. As is the case with the ninth embodiment, a peak transmission power calculating unit 41a stores the measurement results of the transmission power calculating unit 41 for the number (=k) of (terminals of) users, for example, from time T to time T+t (steps S31 to S33) to calculate the peak transmission power Pp (step S34).

Description will be made of the case that the peak power is calculated for each user.

The frame format controlling unit 36 compares the calculated peak transmission power Pue_k for each user with a peak transmission power threshold Pue_th (step S35) and if the peak transmission power Pue_k is higher (step S35, yes), the terminal MSk is notified of the change in the utilized frame format (step S36). The above process is performed for each terminal (MS1 to MSk) in communication.

In this way, the peak transmission power of the entire base transceiver station can be constrained to a lower level. Therefore, the same effects as the first embodiment can be obtained.

Thirteenth Embodiment

In the twelfth embodiment, the frame format control is performed with the use of the peak transmission power of the entire base transceiver station in addition to the peak transmission power for each user or service.

Figure 31:
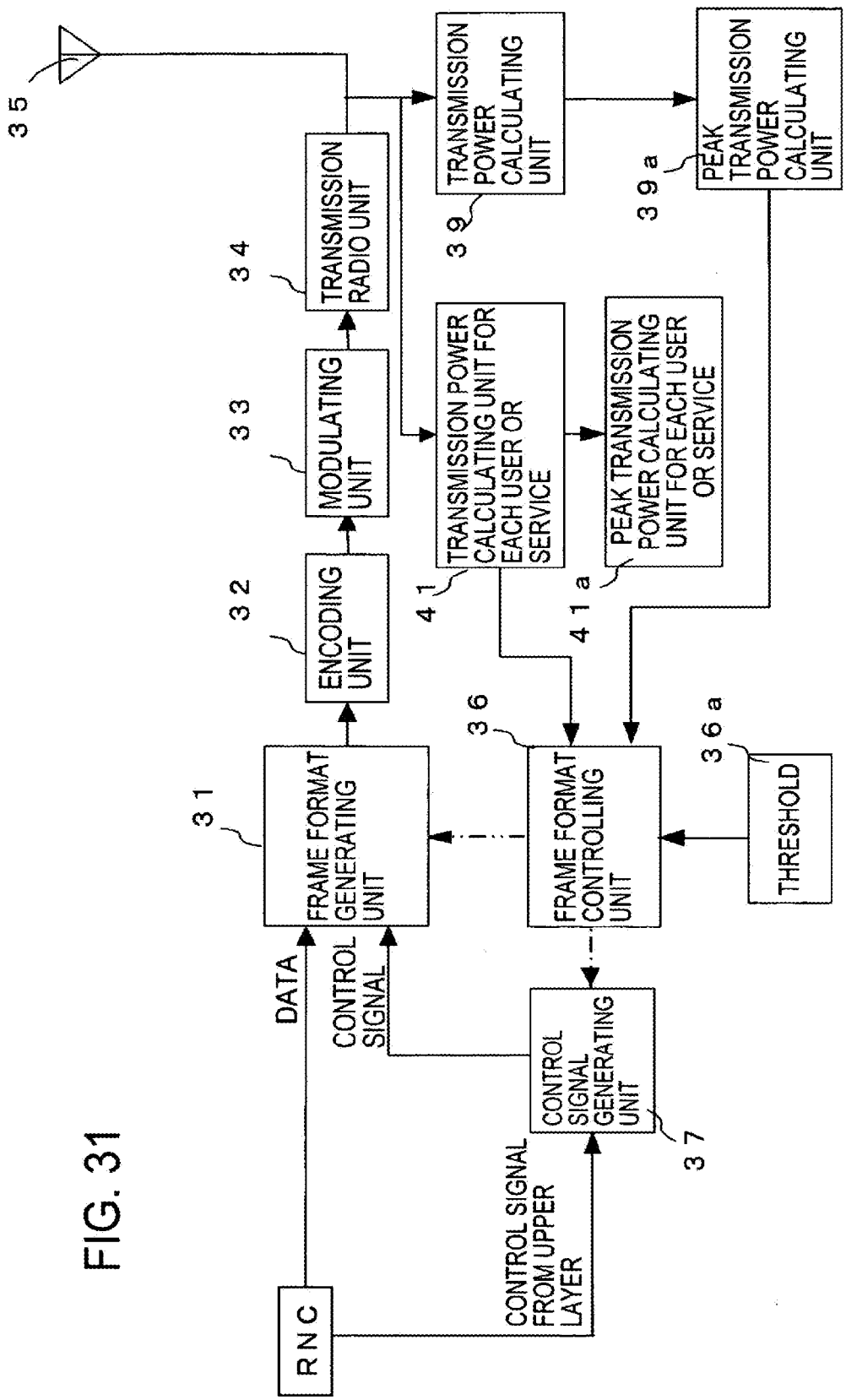
FIG. 31 shows a configuration example of the base transceiver station BTS corresponding to the thirteenth embodiment.
Figure 32:
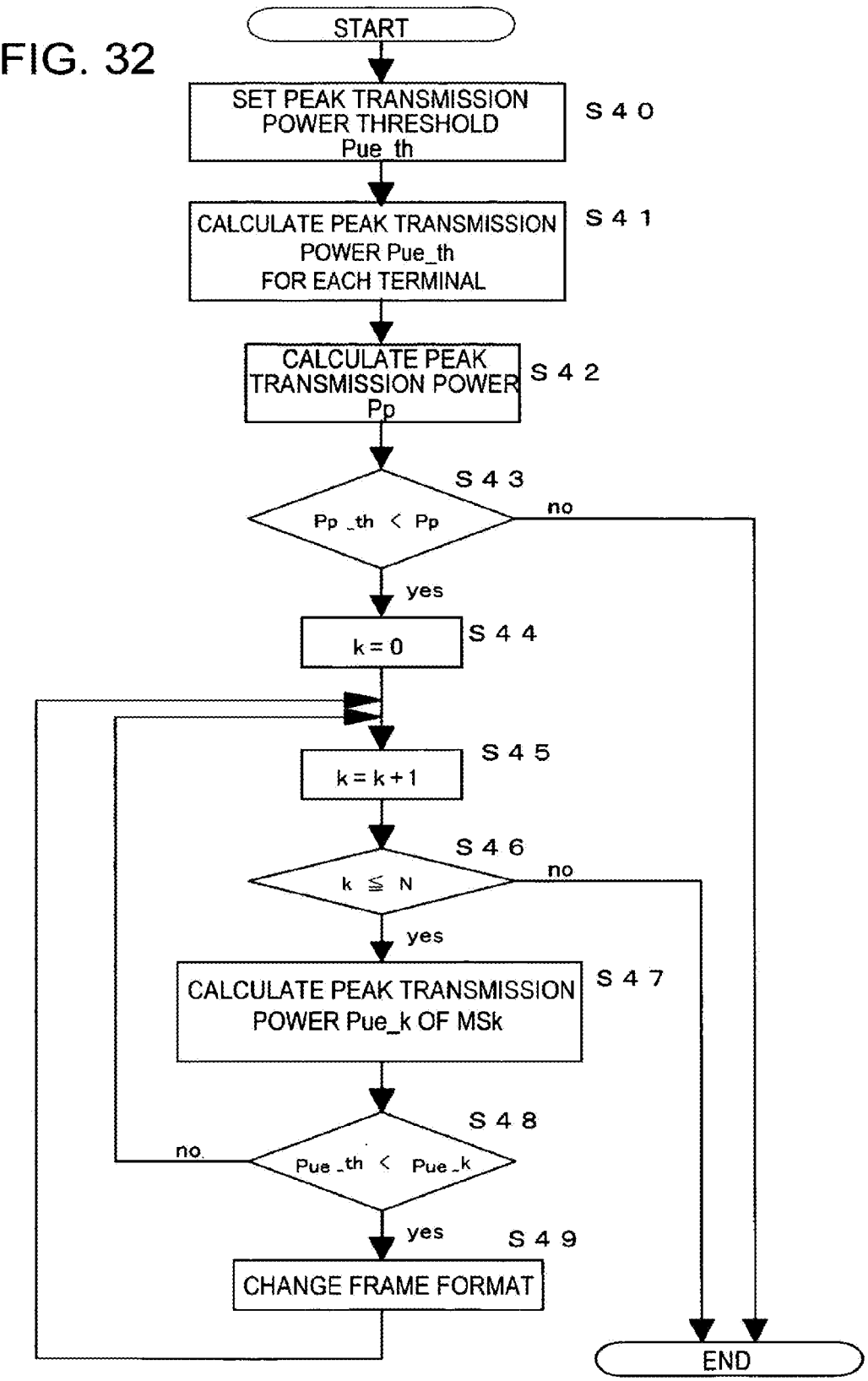
FIG. 32 shows an example of a process flow corresponding to the thirteenth embodiment.

FIG. 31 shows a configuration example of the base transceiver station BTS corresponding to a thirteenth embodiment and FIG. 32 shows an example of the process flow thereof.

When the base transceiver station BTS is activated or when the connection is established, a peak transmission power threshold Pp_th (36a) of the entire base transceiver station BTS and a peak transmission power threshold Pue_th (36b) for each user or service are set (steps S40, S41). Since the service may be different for the same user, the service and the user are not in a dependent relationship.

Description will be made of an example of the user case.

The output of the transmission radio unit 34 is measured by the output power calculating unit 39 to measure and calculate the transmission power of the entire base transceiver station BTS. This is repeated for a certain period to calculate the peak transmission power of the base transceiver station BTS.

In parallel with these processes, the output of the base transceiver station transmission radio unit 34 is subjected to frequency separation for each user, for example, by a filter (not shown in FIG. 32), and the transmission power for each user is measured and calculated by the transmission power calculating unit 39. This is performed for a certain period as is the case with the ninth embodiment and the peak transmission power Pp is calculated by a peak transmission power calculating unit 39a (step S42).

These pieces of information are delivered to the frame format controlling unit 36.

The frame format controlling unit 36 compares the peak transmission power Pp of the entire base transceiver station with a peak transmission power threshold Pue_th of the entire base transceiver station (step S43) and if the peak transmission power Pp is higher (step S43, yes), it is determined that the utilized frame format is needed to be changed (step S49).

If it is determined that the format is needed to be changed, a peak transmission power Pue_k for each user is compared with a peak transmission power threshold Pue_th for each user (steps S44 to S48) and if the peak transmission power Pue_k is higher (step S48, yes), the utilized frame format of the terminal MSk is changed (step S49). This process is performed for each terminal (MS1 to MSk).

Only the frame format used by one user may be changed if the peak transmission power of the entire base transceiver station BTS can be constrained to a lower level that is equal to or less than the threshold.

In this way, the peak transmission power of the entire base transceiver station can be constrained to a lower level. Therefore, the same effects as the first embodiment can be obtained.

The comparison between the peak transmission power Pp of the entire base transceiver station and the peak transmission power threshold Pue_th may be performed concurrently with the comparison between the peak transmission power Pue_k for each user and the peak transmission power threshold Pue_th for each user.

Fourteenth Embodiment

In the first to thirteenth embodiments, the peak transmission power has been calculated from the output of the transmission radio unit 34. In this embodiment, the peak transmission power is calculated based on a base band signal, for example, the output of the modulating unit 33.

Figure 33:
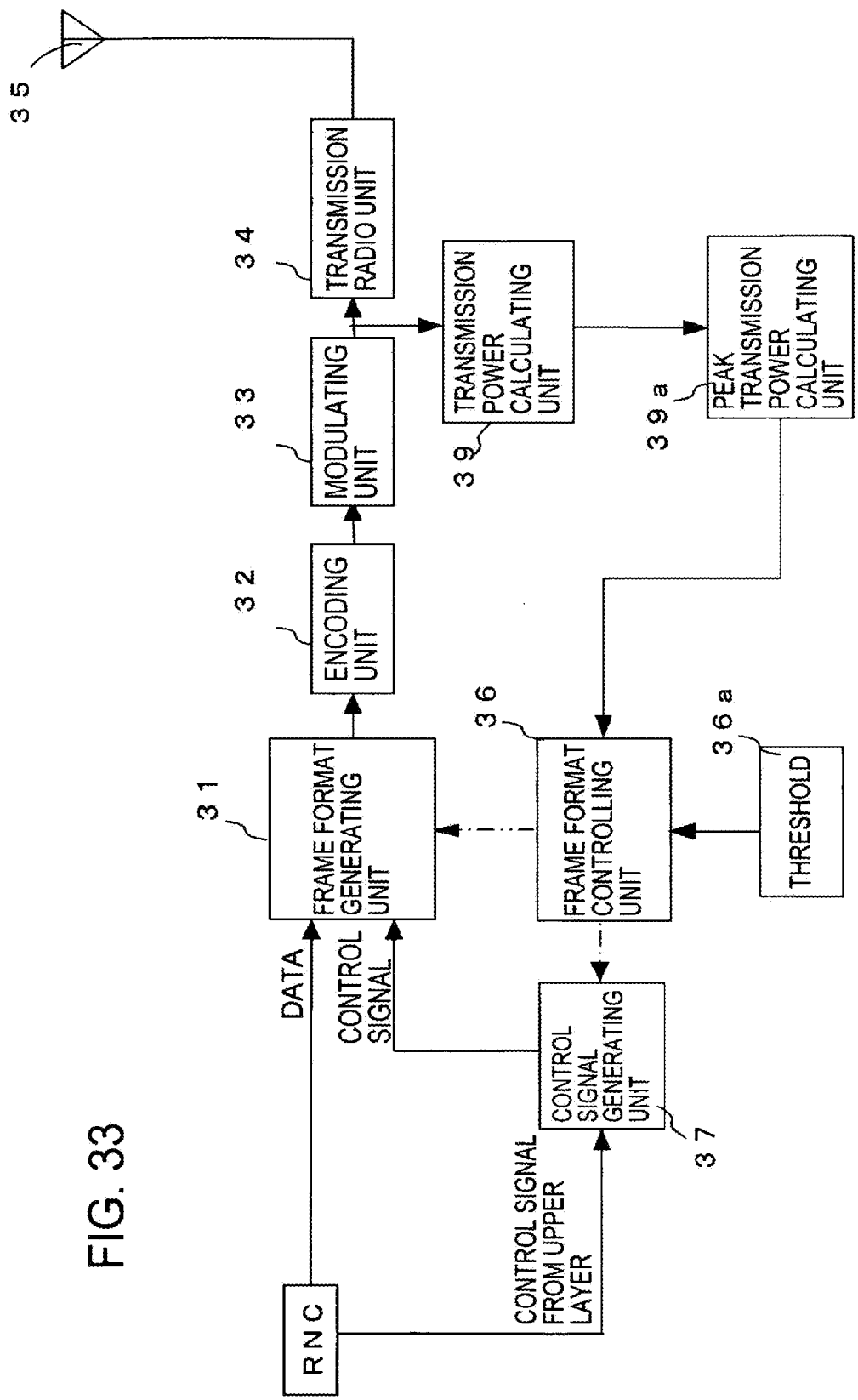
FIG. 33 shows a configuration example of the base transceiver station BTS corresponding to the fourteenth embodiment.

FIG. 33 shows a configuration example of the base transceiver station corresponding to a fourteenth embodiment and the process flow thereof is the same as the fifth embodiment.

In the transmission power control of the current mobile communication system, the transmission power is typically controlled by performing the amplitude control of the base band signal because of easiness of the control. Therefore, in the fourteenth embodiment, description will be made of the case that the transmission power control of the above embodiment is applied to the base band signal.

When the base transceiver station BTS is activated or when the connection is established, a peak transmission power threshold Pbb_th (36e) is set.

The output power of the modulating unit 33 is measured and calculated by the transmission power calculating unit 39. Specifically, the base band signal power is calculated from the output of the modulating unit 33, i.e., the base band signal, and the transmission power is calculated from the gain of the transmission radio unit 34 at the time. The peak transmission power Pbb is calculated from these results for a certain period.

The peak transmission power Pbb and the threshold Pbb_th are compared by the frame format controlling unit 36 and if the peak transmission power is higher, it is determined that the utilized frame format is needed to be changed.

The frame format controlling unit 36 selects the terminal where the utilized frame format is changed, to which the frame format after the change is notified. In the method of selecting the terminal MS, for example, the selected terminal MS may be a terminal that has the highest transmission power when the transmission power reaches a peak.

The same process as the fifth embodiment is performed subsequently. In this way, the peak transmission power of the entire base transceiver station can be constrained to a lower level. Therefore, the same effects as the first embodiment can be obtained.

Although the transmission power is estimated in the above description, the control may be performed directly from the power of the base band signal. Although the output of the modulating unit is used, the intermediate frequency (IF) may be used and a signal before modulation may also be used.

Fifteenth Embodiment

In the twelfth embodiment, the utilized frame format is controlled with the base band signal as is the case with the fourteenth embodiment.

Figure 34:
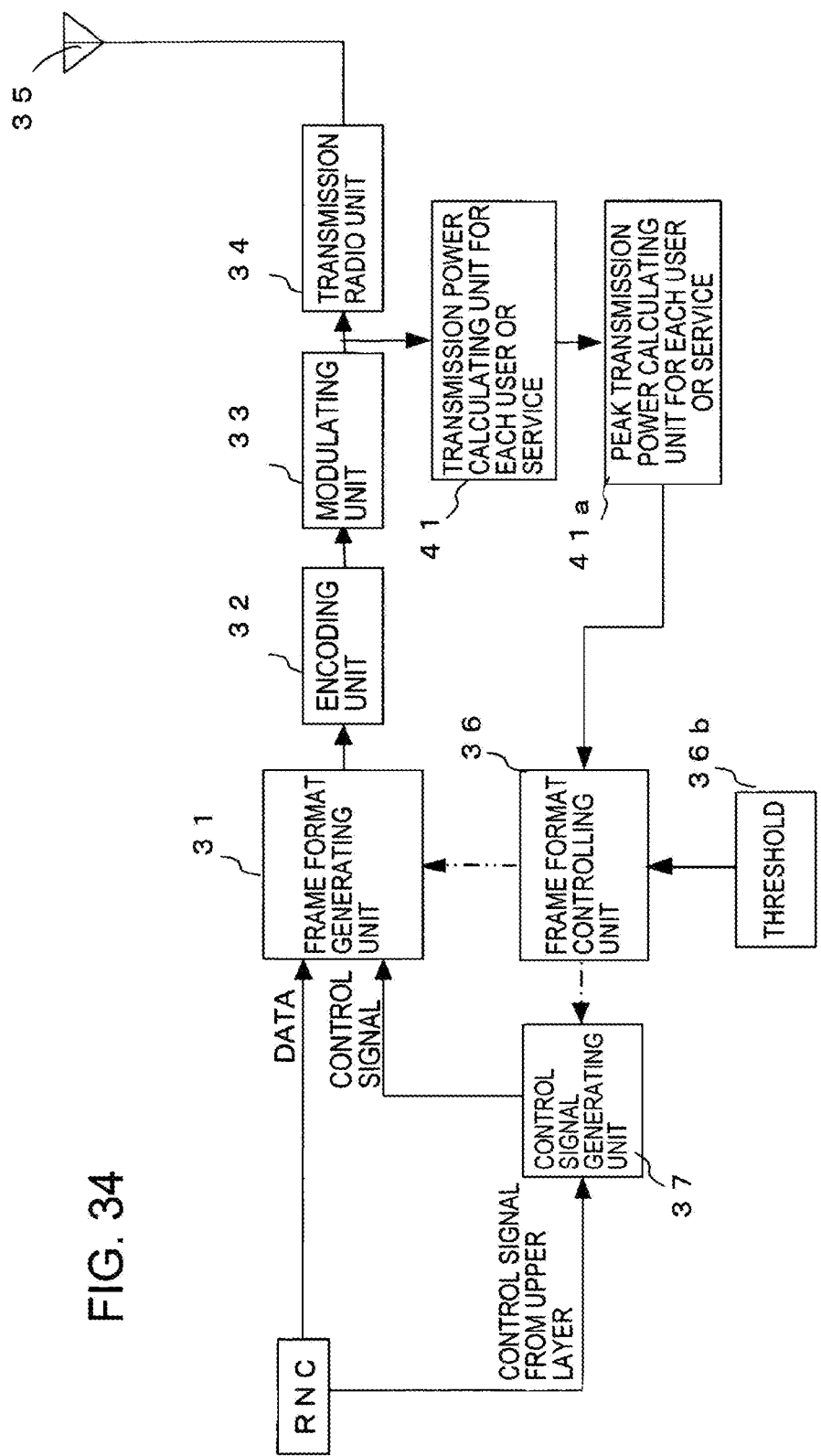
FIG. 34 shows a configuration example of the base transceiver station BTS corresponding to the fifteenth embodiment.

FIG. 34 shows a configuration example of a base transceiver station BTS corresponding to a fifteenth embodiment. When the base transceiver station BTS is activated or when the connection is established, a peak transmission power threshold 36b is set for each user or service.

The output of the base transceiver station modulating unit 33 is subjected to frequency separation for each user or service, for example, by a filter (not shown in FIG. 34), and the transmission power for each user or service is calculated by the transmission power calculating unit 41. This is performed for a certain period as is the case with the ninth embodiment and the peak transmission power is calculated by the peak transmission power calculating unit 41a.

Description will be made of the case that the peak power is calculated for each user. The frame format controlling unit 36 compares the calculated peak transmission power Pue_k for each user with a peak transmission power threshold Pue_th. If the peak transmission power Pue_k is higher, the terminal MSk is notified of the change in the utilized frame format. The above process is performed for each terminal MS1 to MSk in communication.

In this way, the peak transmission power of the entire base transceiver station BTS can be constrained to a lower level. Therefore, the same effects as the first embodiment can be obtained. As is the case with the fourteenth embodiment, the transmission power may be measured and calculated with the use of the output power of the modulating unit 33 and the gain of the transmission radio unit 34, and the control may be performed directly from the power of the base band signal.

Sixteenth Embodiment

In the thirteenth embodiment, the process is performed with the base band signal as is the case with the fourteenth and fifteenth embodiment.

Figure 35:
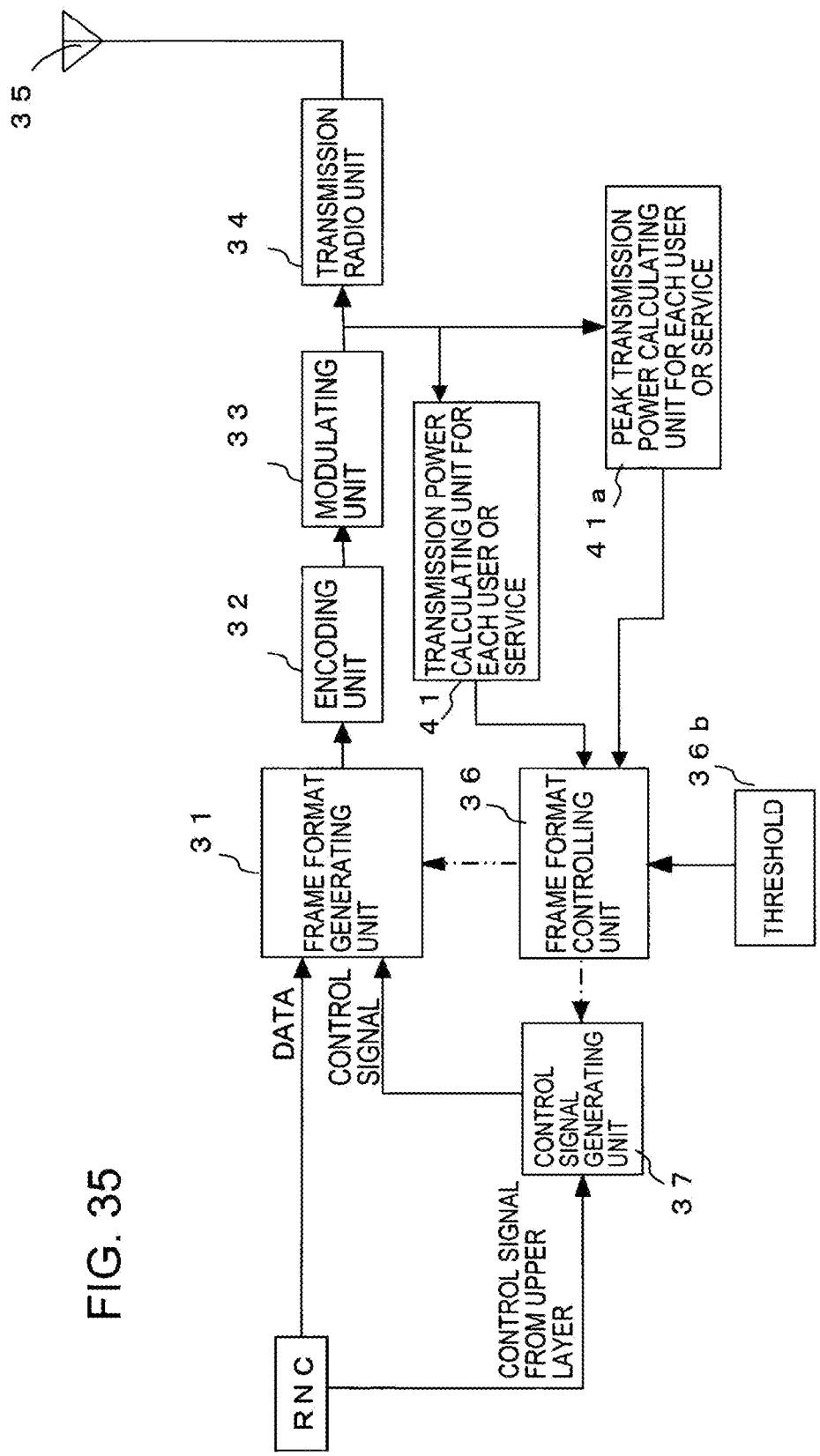
FIG. 35 shows a configuration example of the base transceiver station BTS corresponding to the sixteenth embodiment.

FIG. 35 shows a configuration example of the base transceiver station BTS corresponding to a sixteenth embodiment and the process flow thereof is the same as the thirteenth embodiment.

When the base transceiver station BTS is activated or when the connection is established, a peak transmission power threshold Pp_th of the entire base transceiver station and a peak transmission power threshold for each user or service are set. Since the service may be different for the same user, the service and the user are not in a dependent relationship.

Description will be made of an example of the user case.

The output of the base transceiver station modulating unit 33 is measured by the output power calculating unit 41, and the transmission power of the entire base transceiver station is calculated with the use of the result thereof, the gain of the transmission radio unit 34, etc. This is repeated for a certain period to calculate the peak transmission power of the base transceiver station. In parallel with these processes, the output of the base transceiver station modulating unit is subjected to frequency separation for each user, for example, by a filter (not shown in FIG. 35), and the transmission power for each user is measured and calculated by the transmission power calculating unit 41. The transmission power for each user is calculated with the use of the result thereof, the gain of the transmission radio unit 34, etc. This is performed for a certain period as is the case with the ninth embodiment and the peak transmission power is calculated by the peak transmission power calculating unit 41a.

These pieces of information are delivered to the frame format controlling unit 36.

The frame format controlling unit 36 compares the peak transmission power Pp of the entire base transceiver station BTS with the peak transmission power threshold Pue_th of the entire base transceiver station and if the peak transmission power is higher, it is determined that the utilized frame format is needed to be changed.

If it is determined that the format is needed to be changed, the peak transmission power Pue_k for each user is compared with the peak transmission power threshold Pue_th for each user and if the peak transmission power Pue_k is higher, the utilized frame format of the terminal MSk is changed. This process is performed for each terminal.

Only the frame format used by one user may be changed if the peak transmission power of the entire base transceiver station BTS can be constrained to a lower level that is equal to or less than the threshold. In this way, the peak transmission power of the entire base transceiver station can be constrained to a lower level. Therefore, the same effects as the first embodiment can be obtained.

As is the case with the fourteenth embodiment, the transmission power may be calculated with the use of the output power of the modulating unit 33 and the gain of the transmission radio unit 34, and the control may be performed directly from the power of the base band signal.

While the illustrative and presently preferred embodiments of the present invention have been described in detail herein, it is to be understood that the inventive concepts may be otherwise variously embodied and employed and that the appended claims are intended to be construed to include such variations except insofar as limited by the prior art.

What is claimed is:
1. A radio communication system in which a plurality of radio channels are divided in a frequency direction and mapped to a radio frame format, wherein each radio channel mapped in the radio frame format is assigned to each user or service, the radio communication system comprising:

a radio communication apparatus; and a terminal, wherein the radio communication apparatus controls a control channel position for each user or service and notifies information used for identifying the control channel position to the terminal.

2. The radio communication system according to claim 1, wherein the terminal receives the pilot signal and the data signal according to the notified information.

3. A connection setting method in a radio communication system with each radio channel including a pilot signal and a data signal, the radio communication system dividing a plurality of radio channels in a frequency direction for mapping to a radio frame format, the method comprising:

selecting, by a base station, an unutilized radio frame format from a plurality of radio formats with pilot signal positions controlled for each user or service;

notifying from a base station, a corresponding terminal of the selected radio frame format; and notifying from the corresponding terminal, the base station of the completion of a setting to start data transmission/reception with the use of the notified radio frame format.

4. A base station used in a radio communication system in which a plurality of radio channels are divided in a frequency direction and mapped to a radio frame format, each radio channel being constituted with a control signal and a data signal for each user or service, the radio communication apparatus comprising:

a radio frame format control unit controls a control channel position for each user or service; and a transmitting unit transmits information used for identifying the control channel position to the terminal.

5. A terminal used in a radio communication system in which a plurality of radio channels are divided in a frequency direction and mapped to a radio frame format, each radio channel being constituted with a control signal and a data signal for each user or service, the radio communication apparatus comprising:

a receiving unit receives a control channel according to the information used for identifying control channel position from a base station wherein said control channel position is controlled by the base station.

* * * * *